US 6,637,957 B2

(12) United States Patent
Mastinick et al.

(10) Patent No.: US 6,637,957 B2
(45) Date of Patent: Oct. 28, 2003

(54) PRINTER WITH RIBBON FOLD OUT MECHANISM AND PLASTIC RIBBON CLUTCH

(75) Inventors: Philip Mastinick, Camarillo, CA (US); Lawrence E. Smolenski, Newbury Park, CA (US)

(73) Assignee: ZIH Corp., Wilmington, DE (US)

( * ) Notice: Subject to any disclaimer, the term of this patent is extended or adjusted under 35 U.S.C. 154(b) by 125 days.

(21) Appl. No.: 09/960,105

(22) Filed: Sep. 20, 2001

(65) Prior Publication Data

US 2002/0041782 A1 Apr. 11, 2002

Related U.S. Application Data

(63) Continuation-in-part of application No. 09/675,193, filed on Sep. 29, 2000, now Pat. No. 6,494,631.
(60) Provisional application No. 60/292,166, filed on May 17, 2001.

(51) Int. Cl.[7] .................................. B41J 33/14
(52) U.S. Cl. .................. 400/223; 192/30 R; 192/39; 192/48.1; 192/113.1; 192/70.14; 192/70.11; 446/8; 74/343
(58) Field of Search .................. 400/223, 208, 400/234, 236; 192/30 R, 39, 48.1, 53.1, 53.32, 113.1, 113.26, 70.14, 70.11, 70.17, 107 M; 446/7, 8; 74/411, 343, 345, 361

(56) References Cited

U.S. PATENT DOCUMENTS

| 3,105,371 | A | * | 10/1963 | Forrest .................. 74/411 |
| 3,654,777 | A | * | 4/1972 | Grundman ............. 192/107 M |
| 3,681,940 | A | * | 8/1972 | Albrile .................. 192/70.14 |
| 3,756,325 | A | * | 9/1973 | Rulinski ................ 192/70.11 |
| 4,921,736 | A | * | 5/1990 | Miller et al. .............. 428/36.4 |
| 5,056,940 | A | * | 10/1991 | Basile ..................... 400/208 |
| 5,092,440 | A | * | 3/1992 | Nakano ................. 192/70.14 |
| 5,646,076 | A | * | 7/1997 | Bortz .................... 442/136 |
| 5,771,999 | A | * | 6/1998 | Kleifges ................ 192/70.17 |
| 5,820,279 | A |   | 10/1998 | Lodwig et al. |
| 6,419,062 | B1 | * | 7/2002 | Crowe .................. 192/107 M |
| 6,524,681 | B1 | * | 2/2003 | Seitz .................... 192/107 M |

FOREIGN PATENT DOCUMENTS

JP  40-910542  *  4/1997

OTHER PUBLICATIONS

"Lubricomp—A Guide To LNP'S Internally Lubricated Thermoplastics", LNP A GE Plastics Company, Bulletin #254 2001.

* cited by examiner

Primary Examiner—Eugene H. Eickholt
(74) Attorney, Agent, or Firm—Fulbright & Jaworski LLP

(57) ABSTRACT

A ribbon mechanism mounted in the lid of a printer includes a ribbon carriage pivotally coupled to the lid for folding out of the lid by virtue of its mass when the lid is open and for folding in the lid as the lid is closed. The invention comprises a clutch disk made of plastic, which may be used in a printer mechanism. The design utilizes two different injection molded plastic clutch disks that run face to face to produce relatively high dynamic and low static frictional forces. The clutch assembly uses raised areas on one of the pair of clutch disks. The raised areas allow a better overall contact between the disks so as to achieve more desirable coefficients of friction. The materials chosen for the clutch disks not only have the desirable coefficients of friction, but also have good wear characteristics against each other.

14 Claims, 15 Drawing Sheets

PRINTER WITH RIBBON FOLD OUT MECHANISM AND PLASTIC RIBBON CLUTCH

This application is a Continuation-In-Part of the non-provisional application Ser. No. 09/675,193 filed on Sep. 29, 2000 now U.S. Pat. No. 6,494,631.

This application claims the benefit of Provisional Application No. 60/292,166 filed May 17, 2001.

FIELD OF THE INVENTION

The present invention relates generally to printers and more particularly to a ribbon fold out mechanism mounted in the lid of a thermal printer to facilitate loading of ribbon media and printhead maintenance.

The invention relates to clutch assemblies, in particular, to clutch assemblies for printers.

BACKGROUND

A thermal printer is usually provided with a printhead which comprises a large number of exothermic resistors arranged on an electrically insulating base. By selectively applying electric current to the exothermic resistors, heat is generated and applied to a thermo-sensitive print medium so as to print characters, pictures or both. The basic construction of a conventional thermal transfer printer includes a platen, thermal printhead, ribbon supply and take up mechanism, stepping motor and a gear train for driving the platen. A continuous strip of print media (e.g., paper, cloth, etc.) usually from a clamped print media roll is positioned between the platen and the ribbon with the thermal printhead caused to press the ribbon against the print media thereby printing characters or pictures on the print media strip using heat generated from the thermal printhead.

One of the most important aspects for the user in setting up a thermal transfer printer for printing is ribbon and media loading. Ribbon loading in conventional thermal transfer printers is a complicated, generally undesirable task, which frequently involves ten or more steps. The usual steps are unlatching the printer, opening the lid of the printer, loading the ribbon supply roll, loading the ribbon take up roll, opening up the ribbon mechanism, threading the ribbon, wrapping the ribbon around the ribbon mechanism, taping it to the ribbon take up roll, taking up the ribbon slack, closing the lid of the printer and finally, re-latching the printer. Of the above-described steps, ribbon threading is usually the most difficult step to accomplish and as such can be a source of frustration for the user. Media loading usually requires the user to thread the media under or through the ribbon mechanism. Furthermore, conventional thermal transfer printers do not provide easy access to the thermal printhead for maintenance, which adds to the overall cost of meeting the printing needs of the average user.

Therefore, the need arises for an improved, low cost thermal transfer printer, which significantly reduces the number of steps involved in ribbon and media loading. Such a printer should preferably be capable of loading ribbon and media without having to thread through/around the ribbon mechanism. The need also arises for a thermal transfer printer, which provides easier access to the thermal printhead for regular maintenance by the user.

In the past, printer clutch assemblies have typically used a felt or felt-like material or metal on the interface of clutch disks to provide the necessary frictional coupling. In the past, it has been found that injection molding of a plastic did not result in a smooth, even surface. Therefore, trying to produce injection molded clutch disk pairs did not result in a viable clutch assembly, since the actual point or points of contact between the two disks was minimal. There tended to be approximately three high points on a disk. An injection molded plastic clutch assembly would be highly desirable, if one were able to mold an acceptable disk with the desired mechanical properties. It would help achieve lower costs and smaller sizes in items of which it is a component, if the materials chosen for the clutch disks not only have the desirable coefficients of friction, but also have good wear characteristics against each other.

SUMMARY OF THE INVENTION

The present invention meets the above needs and is directed to a printer comprising a base having a platen, a lid coupled to the base, the lid having an open position and a closed position, a ribbon mechanism coupled to the lid, means for driving the ribbon mechanism and the platen when the lid is in the closed position and means for automatically presenting the ribbon mechanism for loading of ribbon when the lid is in the open position.

The invention comprises a clutch disk made of plastic, which may be used in a printer mechanism. The design utilizes two different injection molded plastic clutch disks that run face to face to produce relatively high dynamic frictional forces and relatively low static frictional forces. The two plastics used are LNP Engineering Plastics DFL-4036 and RCL-4036. The clutch assembly uses raised areas on one of the pair of clutch disks. The raised areas allow a better overall contact between the disks so as to achieve a higher effective dynamic coefficient of friction and a lower effective static coefficient of friction. Samples of various designs of the raised areas are arranged so that spaces exist between the sectors of raised areas. These spaces allow for debris to be swept into these non-contacting areas so as to reduce wear from particles tending to be trapped between the contacting surfaces of the clutch disks. The materials chosen for the clutch disks not only have the desirable coefficients of friction, but also wear well against each other.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENT

Figure 1:
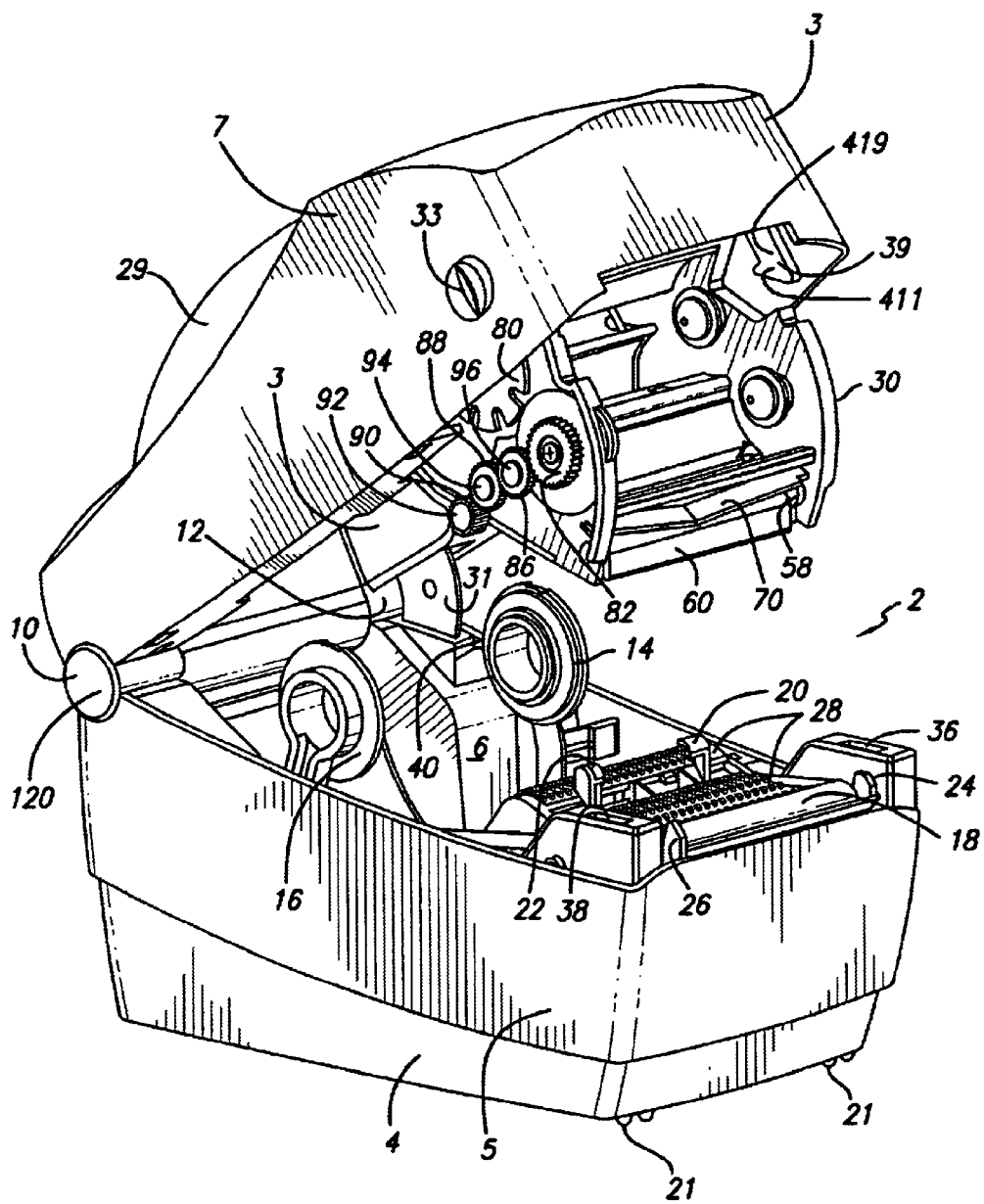
FIG. 1 is a perspective view of a printer in accordance with the present invention.

The following description is of the best mode presently contemplated for carrying out the invention. This description is not to be taken in a limiting sense, but is merely made for the purpose of describing the general principles of the invention.

In the figures, the drawings are not to scale and reference numerals indicate the various features of the invention, like numerals referring to like features throughout both the drawings and the description.

The following description includes the best mode presently contemplated for carrying out the invention. This description is not to be taken in a limiting sense, but is made merely for the purpose of describing the general principles of the invention.

The present invention is directed to a printer, generally referred to by reference numeral 2, which can be used for thermal transfer printing (with ribbon) or for direct thermal printing (without ribbon) as needed by the user (FIG. 1).

As shown in FIGS. 1–4, printer 2 comprises a base 4 having a lower frame 6 hinged to an upper frame 8 of a printer lid 3 by way of hinges 10, 12. Hinge 12 is an integral part of lower frame 6, while hinge 10 is a separate removable part adapted for mounting to one end of lower frame 6. Lower frame 6 is screwed to a base cover 5 to form base 4 and upper frame 8 is screwed to a lid cover 7 to form printer lid 3. The bottom of base cover 5 may be provided with a plurality of support legs, such as support legs 21 in FIG. 1.

Lower frame 6 is used for mounting a platen 18, a pair of adjustable print media (paper, cloth and the like) roll holders 14, 16, a pair of adjustable print media guides 20, 22, a pair of printhead alignment tabs 24, 26, a lower gear train 201 (FIG. 14—one of the gears is not shown), a stepping motor 13 (FIG. 14) and a main circuit board (not shown) for controlling the operation of printer 2. A portion 28 on the outer surface of lower frame 6 is conventionally ribbed to reduce the surface contact area for the passing print media. Base 4 may be further provided in the back with a power switch (not shown), a power jack (not shown) for coupling an external power supply, a serial port (not shown), a parallel port (not shown) and/or a universal serial bus (USB) port (not shown) for connecting printer 2 to a computer or other device.

Figure 10:
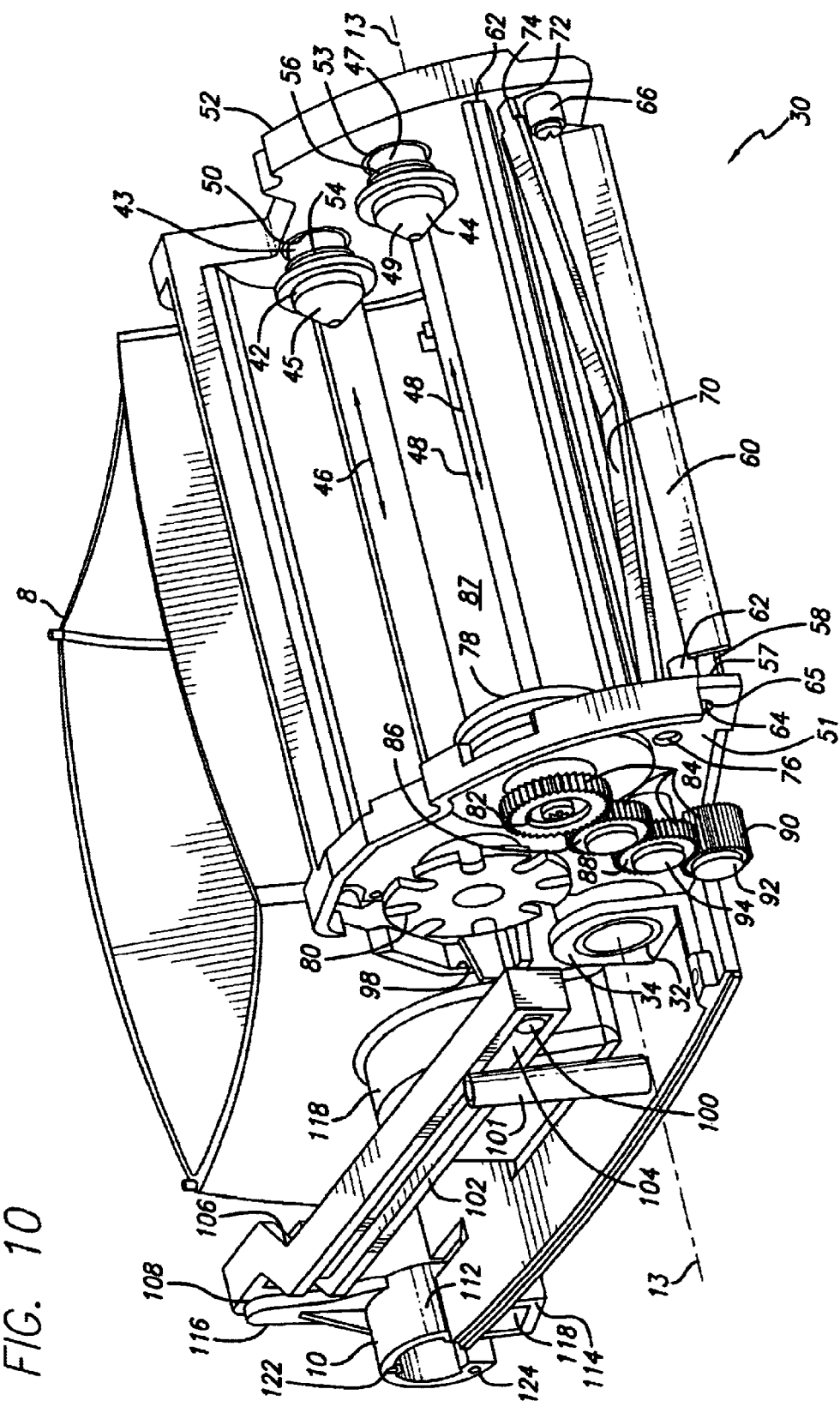
FIG. 10 is a perspective view of the internal structure of the printer lid shown in FIG. 9 in accordance with the present invention.

Upper frame 8 is used to pivotally mount a ribbon carriage 30 designed to receive a ribbon supply roll (not shown), a ribbon take up roll/core (not shown) and a thermal printhead 58 (FIG. 10). Ribbon carriage 30 may be injection molded as one piece from a suitable light-weight material. For example, ribbon carriage 30 may be injection molded from polycarbonate material containing 15% carbon fiber and 2% silicone for stiffness and static charge dissipation. The ribbon take up roll/core is driven by an upper gear train 84 (FIGS. 3, 4, 8) mounted on one side of ribbon carriage 30. Upper gear train 84 is driven by lower gear train 201 which in turn is driven by a shaft 203 (FIG. 14) of stepping motor 13.

Figure 12:
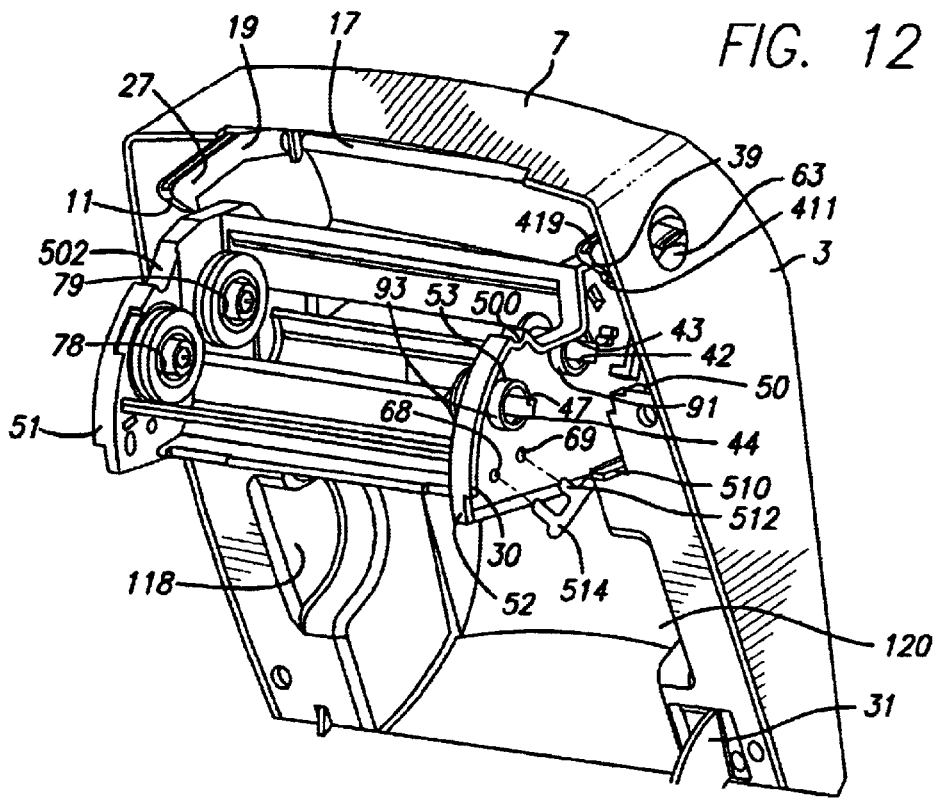
FIG. 12 is a perspective view of a printer lid for use in accordance with the present invention.
Figure 15:
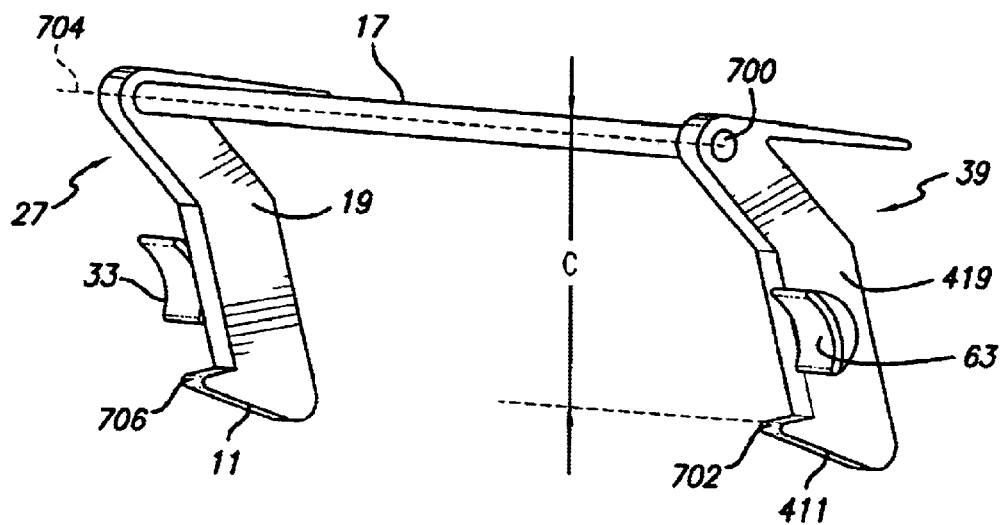
FIG. 15 is a perspective view of a latching system for use in accordance with the present invention.

Lid 3 is preferably provided with a see-through dome 29 to permit lid 3 to be closed with a large roll of print media (paper) held by adjustable print media roll holders 14, 16. Lid 3 is also provided generally in its top portion with a pair of spaced apart latches, such as latch 39 in FIG. 1 and latch 27 in FIG. 12. Latch 27 has a generally hook-like body 19 which ends with a substantially flat outer foot 11 for engaging a corresponding latch opening 38 (FIG. 1) provided at the front end of lower frame 6 of base 4 when lid 3 is in a fully closed position so as to lock printer 2 during printer operation. As illustrated in FIGS. 1 and 12, latch 39 similarly has a generally hook-like body 419 which ends with a substantially flat outer foot 411 for engaging a corresponding latch opening 36 (FIG. 1) provided at the front end of lower frame 6 of base 4. As shown in FIGS. 12 and 15, latch 27 and latch 39 are mounted on a latch shaft 17 made preferably of light weight metal (such as aluminum) with latch shaft 17 hinged generally in the upper inner portion of lid 3 on a pair of integral spaced apart plastic clips (not shown). Latch 27 is provided with an integral latch release 33 (FIGS. 1, 15) for manually turning latch 27 inward (toward the interior of lid 3) so as to release (unlock) lid 3 from base 4. Similarly, latch 39 is provided with an integral latch release 63 (FIGS. 12, 15) for manually turning latch 39 inward (toward the interior of lid 3) so as to release (unlock) lid 3 from base 4.

Furthermore, as shown in FIGS. 1–4, a lid lock 31 is provided for automatically locking lid 3 in a fully open position in accordance with the present invention. Lid lock 31, which is preferably made of plastic and shaped generally as an annular strip, is mounted at one end of upper frame 8 for mating with a corresponding lid lock slot 40 provided respectively at one end of lower frame 6 (FIGS. 1–4). Lid lock 31 has a generally outwardly (toward the exterior side wall of base 4) curved bottom portion 37 for engaging a corresponding channel 41 provided adjacent lid lock slot 40. Lid lock 31 is mounted at one end of upper frame 8 such that its outwardly curved bottom portion 37 is aligned for automatic engagement in channel 41 when lid 3 is fully open to prevent lid 3 from closing by itself. To close lid 3, the user manually pushes lid lock 31 inward (toward the interior of lower frame 6) to disengage bottom portion 37 of lid lock 31 from channel 41 which allows lid lock 31 to move frictionally inside slot 40 (i.e., acts like a spring) as lid 3 is closed by the user. At the fully open position for lid 3, lid lock 31 automatically snaps out of slot 40 with its outwardly curved bottom portion 37 engaging channel 41 to prevent lid 3 from closing on its own by virtue of its mass. Other lid lock arrangements may be used, provided such other arrangements do not deviate from the intended purpose of the present invention.

Ribbon carriage 30 is provided on one side with a spring loaded plastic supply hub 42 and a spring loaded plastic take up hub 44 disposed proximate to supply hub 42 for removably engaging one end of a ribbon supply roll and a ribbon take up core, respectively (FIG. 10). As shown in FIG. 12, ribbon carriage 30 is provided on the other side with a take up clutch assembly 78 and a supply clutch assembly 79 disposed proximate to take up clutch assembly 78 for removably engaging the other end of a ribbon take up/supply roll, respectively. Supply clutch assembly 79 is mounted (e.g., screwed) on a plastic fan-like supply spindle 80 disposed on the other (exterior) side of side wall 51 of ribbon frame 30 (FIGS. 10, 12). Take up clutch assembly 78 is mounted (e.g., screwed) on a take up gear 82 disposed on the other (exterior) side of side wall 51 of ribbon frame 30 (FIGS. 10, 12) which takes up ribbon slack.

Figure 8:
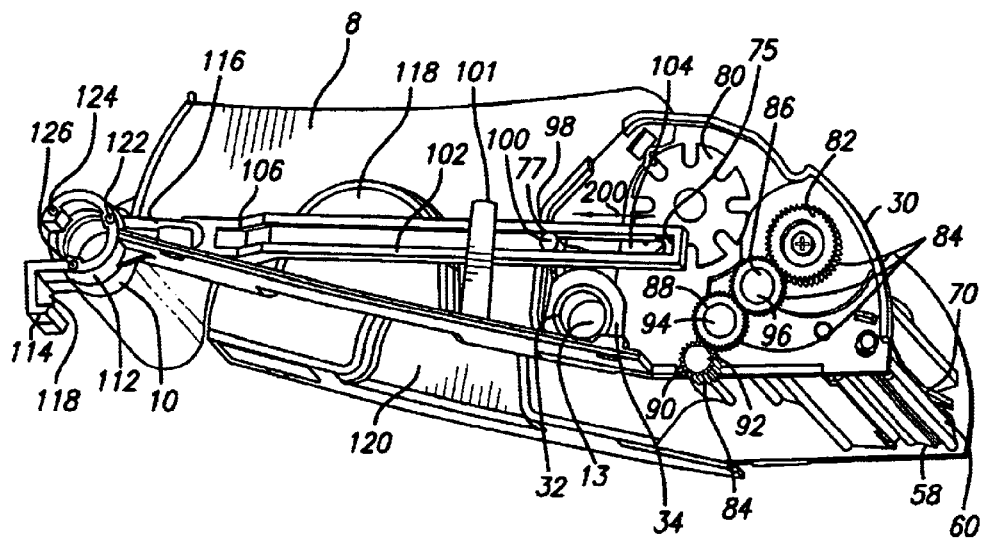
FIG. 8 is a perspective view of the internal structure of the printer lid shown in FIG. 7 in accordance with the present invention.

As shown in FIGS. 8 and 10, take up gear 82 is part of an upper gear train 84 (FIG. 8) which also includes a first idler gear 86 operatively coupled between take up gear 82 and a second idler gear 88 which, in turn, is operatively coupled between first idler gear 86 and a transfer gear 90. When lid 3 is fully closed, power from lower gear train 201 is transferred to upper gear train 84 by way of transfer gear 90 which in this position is operatively coupled to a third idler gear 202 (FIG. 14) which is part of lower gear train 201.

Figure 14:
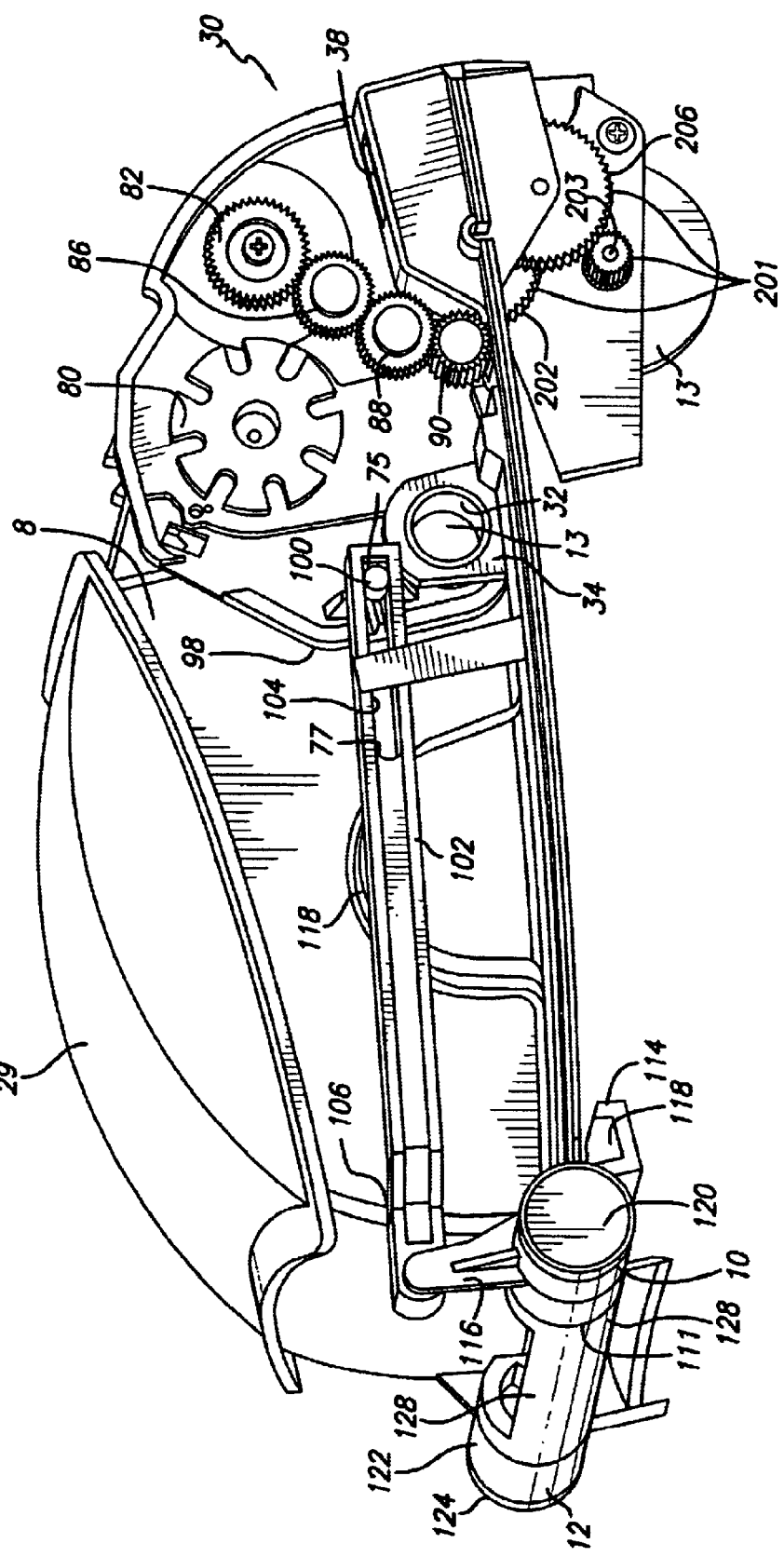
FIG. 14 is a perspective view of a different embodiment of the present invention.

As shown in FIG. 14, lower gear train 201 is mounted on lower frame 6 of base 4 and further includes a pinion gear 204 coupled to shaft 203 of stepping motor 13, a compound gear 206 driven by pinion gear 204 and a platen gear (not shown) coupled to the shaft (not shown) of platen 18 for driving platen 18 during printer operation. Compound gear 206 drives third idler gear 202 which in turn drives the platen gear. The operation of stepping motor 13 is controlled by the main circuit board (not shown). A stepping motor suitable for practicing the present invention may be purchased from Mitsumi Electronics Corporation of Santa Clara, Calif. First and second idler gears 86, 88 and transfer gear 90 are preferably mounted on the exterior side of side wall 51 of ribbon frame 30 with press-in pins 96, 94, 92, respectively, for easy mounting (FIG. 10).

As shown in FIG. 10, supply hub 42 has a cylindrical hollow body 43 with a cone-shaped integral cap 45. Cylindrical hollow body 43 is movably mounted in an aperture 50 of side wall 52 of ribbon carriage 30. Cylindrical body 43 is preferably spring loaded with a coiled helical spring 54 coupled between the bottom of cone-shaped cap 45 and the interior surface of side wall 52 of ribbon carriage 30. Spring 54 allows cylindrical body 43 to be displaced linearly within aperture 50 as shown by arrow 46 during manual loading and unloading of a ribbon supply roll by the user. As best shown in FIG. 12, the back portion of cylindrical hollow body 43 is provided with stop tabs 91 which abut against the outer surface of aperture 50 on the exterior side of side wall 52 preventing cylindrical hollow body 43 from slipping inside aperture 50.

Similarly, take up hub 44 has a cylindrical hollow body 47 with a cone-shaped integral cap 49. Cylindrical body 47 is movably mounted in an aperture 53 of side wall 52 of ribbon carriage 30. Cylindrical hollow body 47 is preferably spring loaded with a coiled helical spring 56 coupled between the bottom of integral cone-shaped cap 49 and the interior surface of side wall 52 of ribbon carriage 30. Spring 56 allows cylindrical body 47 to be displaced linearly within aperture 53 as shown by arrow 48 during manual loading and unloading of a ribbon take up roll (core) by the user. As best shown in FIG. 12, the back portion of cylindrical hollow body 47 is provided with stop tabs 93 which abut against the outer surface of aperture 53 on the exterior side of side wall 52 preventing cylindrical hollow body 47 from slipping inside aperture 53. Other types of ribbon roll loading arrangements may be used in conjunction with ribbon carriage 30 as long as such arrangements fall within the scope of the present invention.

As further illustrated in FIG. 10, ribbon carriage 30 is also used for mounting a floating thermal printhead 58 of the type described in U.S. Pat. No. 6,068,415 to Smolenski, assigned to the assignee of the present application, the disclosure of which is incorporated herein by reference. A thermal printhead suitable for the practice of the present invention may be purchased, for example, from Rohm Co., Ltd. of Kyoto, Japan.

Thermal printhead 58 is fastened with two screws (not shown) to the underside of a generally V-shaped printhead support bracket 60 (FIG. 10) preferably made of the same material as ribbon carriage 30 and removably hinged at each end to side walls 51, 52 of ribbon carriage 30, respectively. Thermal printhead 58 is electrically connected by way of cables 62 with the main circuit board (not shown) housed in base 4 of printer 2. A main circuit board suitable for use with the present invention can be purchased, for example, from the assignee of the present invention.

Figure 11:
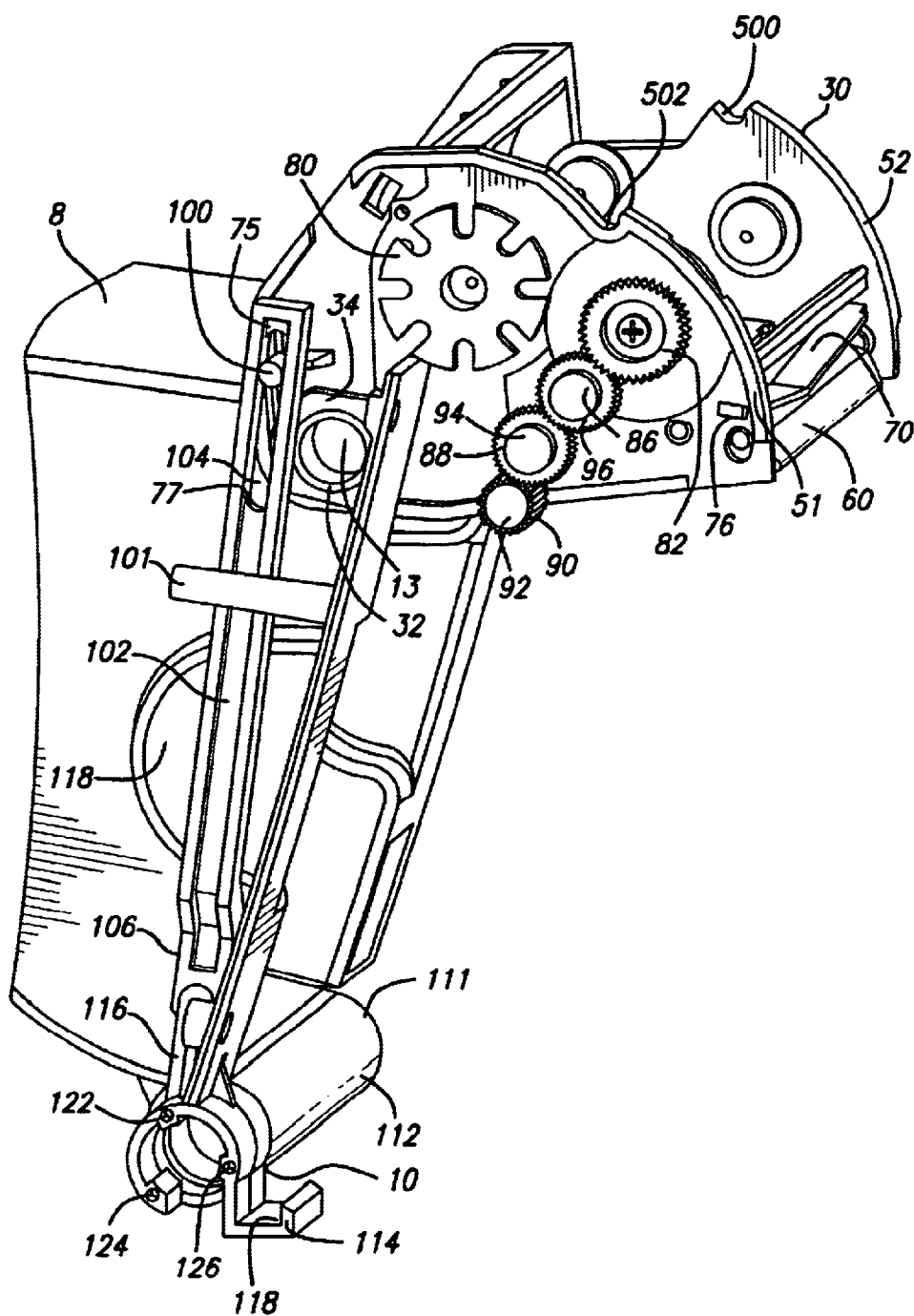
FIG. 11 is a perspective view of yet another preferred embodiment of the present invention.

As depicted in FIG. 10, printhead support bracket 60 is preferably backed up by a compression leaf spring 70 which can be made from a steel strip bent to a certain extent generally in the middle. Leaf spring 70 is removably attached to side wall 52 of ribbon frame 30 by way of a first integral elongated leg 72 and a corresponding leaf spring aperture 74 in side wall 52 and to side wall 51 of ribbon frame 30 by way of a second integral elongated leg (not shown) and a corresponding leaf spring aperture 76 (FIG. 11) in side wall 51 of ribbon frame 30. In one example, leaf spring 70 may be made from a generally V-shaped 0.050 inch thick steel strip.

As shown in FIG. 10, printhead support bracket 60 is removably mounted to side wall 51 of ribbon carriage 30 by way of a pair of integral mounting posts such as post 64 (second post not shown) and a pair of corresponding printhead support bracket apertures such as aperture 65 (FIG. 10) on side wall 51 of ribbon carriage 30 (second aperture not shown) adapted for mating with the pair of integral mounting posts such as post 64.

Figure 16:
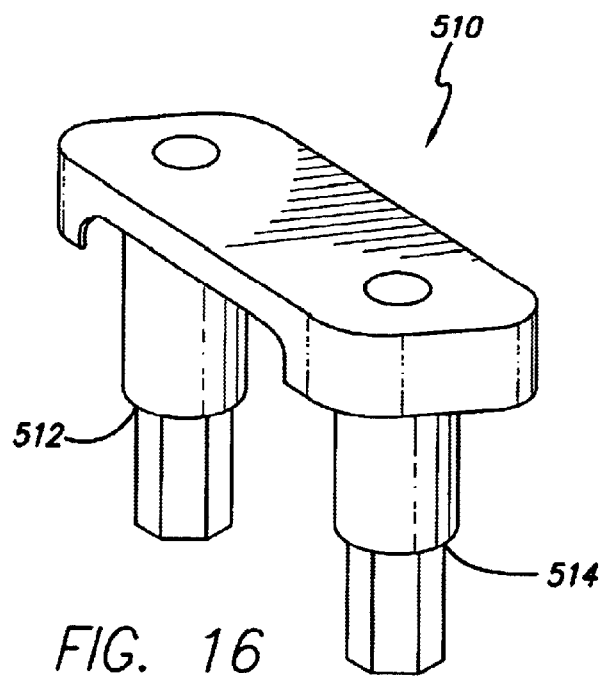
FIG. 16 is a perspective view of a mounting clip for use in accordance with the present invention.

Printhead support bracket 60 is removably mounted to side wall 52 of ribbon carriage 30 by way of a pair of integral hollow bosses such as hollow boss 66 in FIG. 10 (second boss not shown), a pair of corresponding printhead support apertures 68, 69 (FIG. 12) on side wall 52 of ribbon carriage 30 adapted for mating with the pair of integral hollow bosses such as hollow boss 66 and a press-in printhead clip 510 (FIGS. 12, 16) which has two prongs 512, 514, respectively, adapted for insertion (FIG. 12) from the exterior side of side wall 52 through apertures 68, 69 into the respective pair of integral hollow bosses (such as boss 66) of printhead support bracket 60 to allow easy mounting/dismounting of printhead support bracket 60 by the user. Each pair of printhead support bracket apertures on wall 51 or wall 52 is appropriately cut to allow the integral mounting posts and the clipped hollow bosses of printhead support bracket 60 and, therefore, mounted printhead 58 to move or "float" to a certain extent in all three dimensions within their respective apertures on side walls 51, 52 to allow for adjustment of the orientation of printhead 58 vis-a-vis platen 18 for printer operation.

A person skilled in the art would readily appreciate that other methods of attaching and/or backing up thermal printhead 58 may be utilized, provided such other methods do not deviate from the intended purpose of the present invention.

To load a ribbon supply roll, the user pulls the adhesive strip from the ribbon supply roll free (not shown), extends the leader (not shown) through a ribbon carriage cutout 87 (FIG. 10) and couples (not shown) the ribbon supply roll between supply clutch assembly 79 and supply hub 42 which are shaped to accommodate and securely hold each end of the ribbon supply roll during printer operation. To load a ribbon take up roll (core), the user couples the ribbon take up roll between take up clutch assembly 78 and take up hub 44 (not shown) which are shaped to accommodate and securely hold each end of the ribbon take up roll during printer operation. Having installed the ribbon supply and take up rolls, the user pulls (not shown) the leader around printhead 58 and sticks (not shown) the adhesive strip to the take up roll. The user then manually winds take up gear 82 counter-clockwise (towards the installed ribbon supply roll) until the black ribbon portion is visible on the ribbon take up roll which completes the ribbon loading procedure (not shown).

Figure 4:
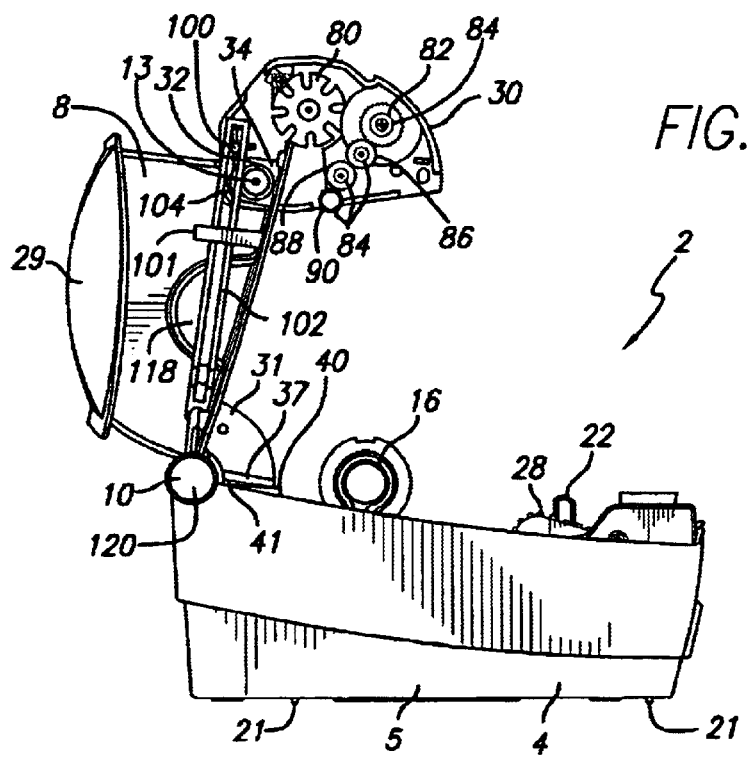
FIG. 4 is a side view of the printer shown in FIG. 3 in accordance with the present invention.
Figure 3:
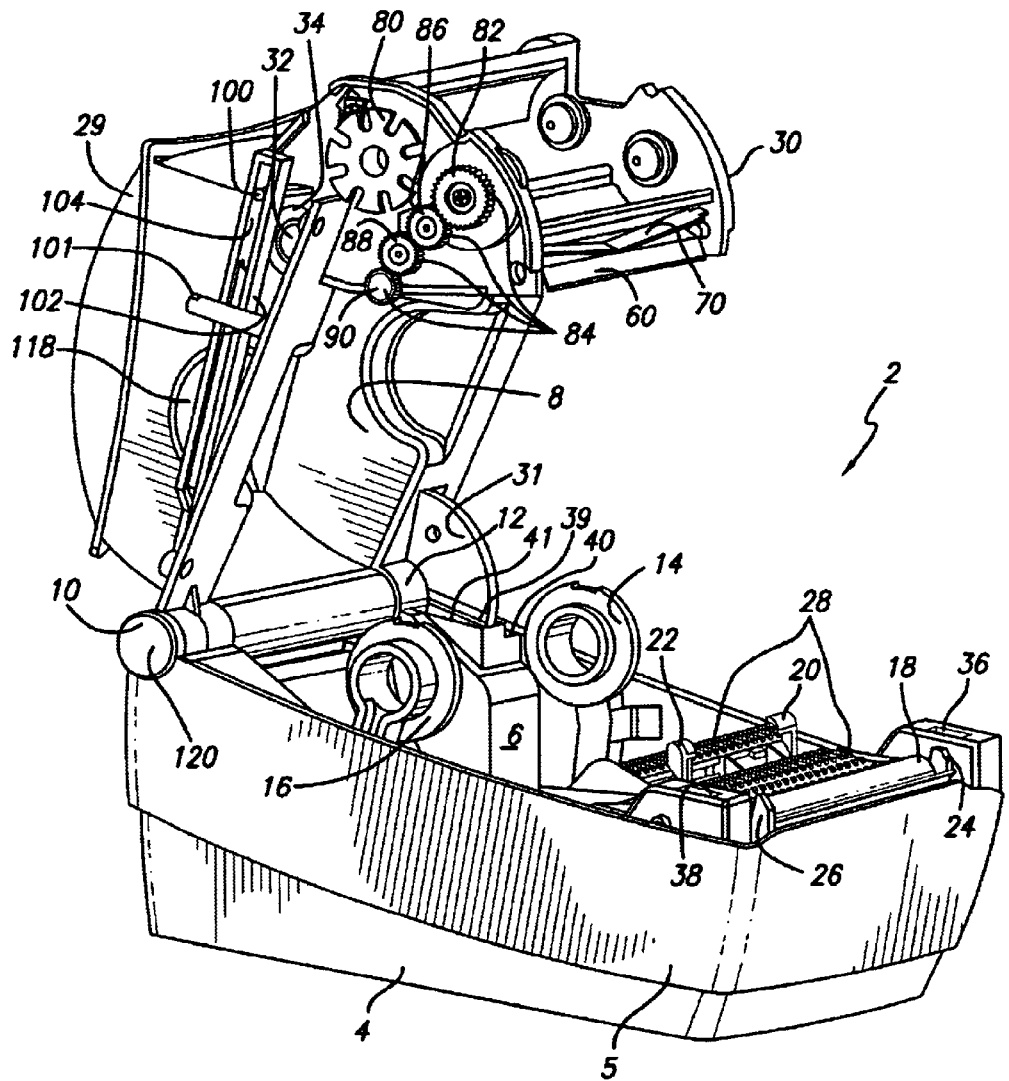
FIG. 3 is a perspective view of the printer of FIG. 1 showing the internal structure of the printer lid in accordance with the present invention.
Figure 7:
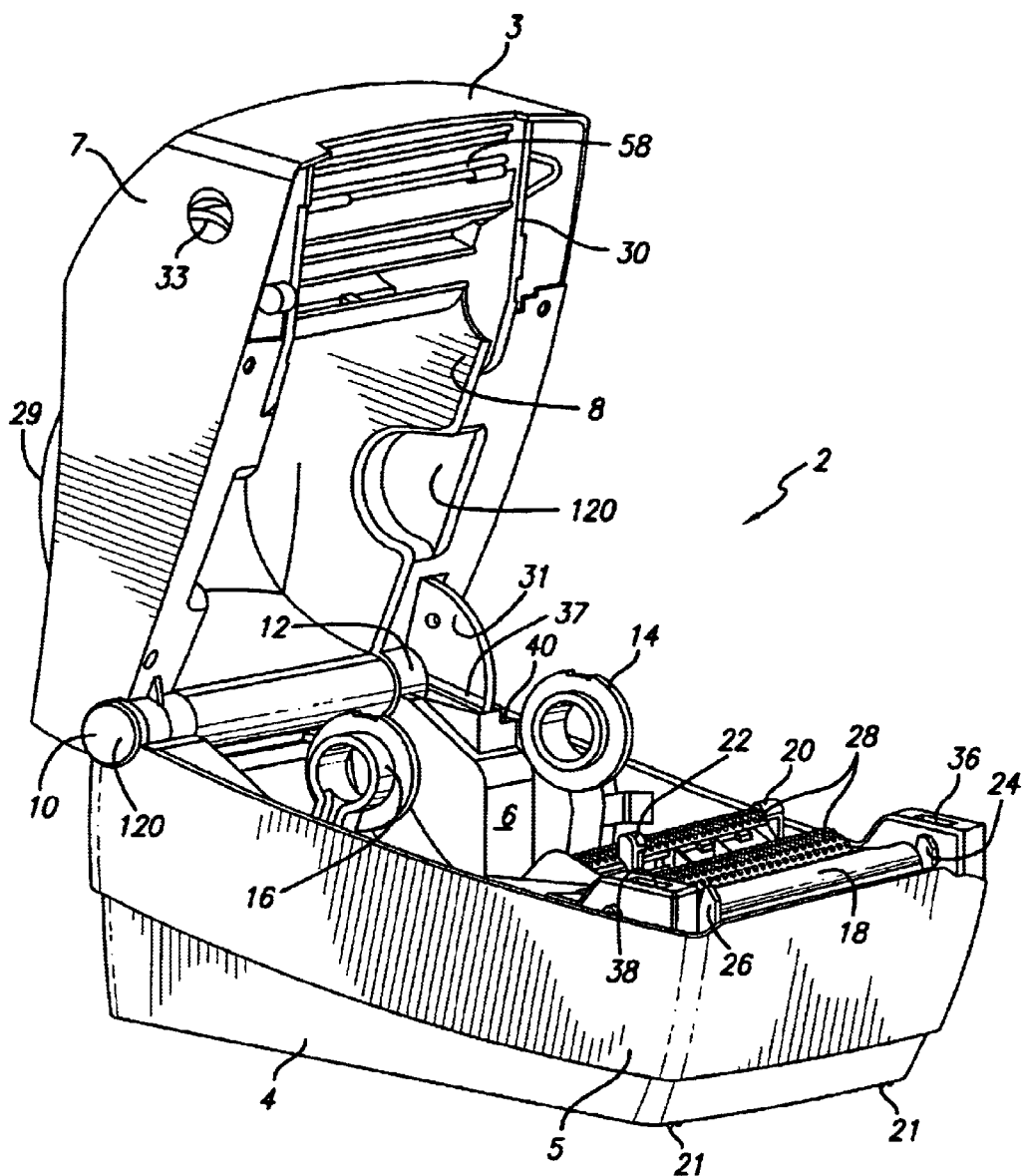
FIG. 7 is perspective view of a preferred embodiment of the present invention.

As further illustrated in FIGS. 4, 10 and in accordance with a preferred embodiment of the present invention, ribbon carriage 30 is hinged on each side to upper frame 8 of lid 3 by way of a pair of integral hollow cylindrical posts 32 (second post not shown) which mate with a corresponding pair of circular slots 34 (second circular slot not shown) provided on upper frame 8. A ribbon carriage axis of rotation (hinge axis) 13 may thus be defined through the center of hollow cylindrical post 32 as depicted in FIG. 10. As illustrated in FIGS. 1, 7, upper frame 8 and ribbon carriage 30 are configured to allow ribbon carriage 30 to rotatably fold in and out of lid 3 within a pre-determined angular range. Other materials, configurations and/or angular ranges may be used to practice the invention, provided such other materials, configurations and/or angular ranges fall within the scope of the present invention.

Figure 5:
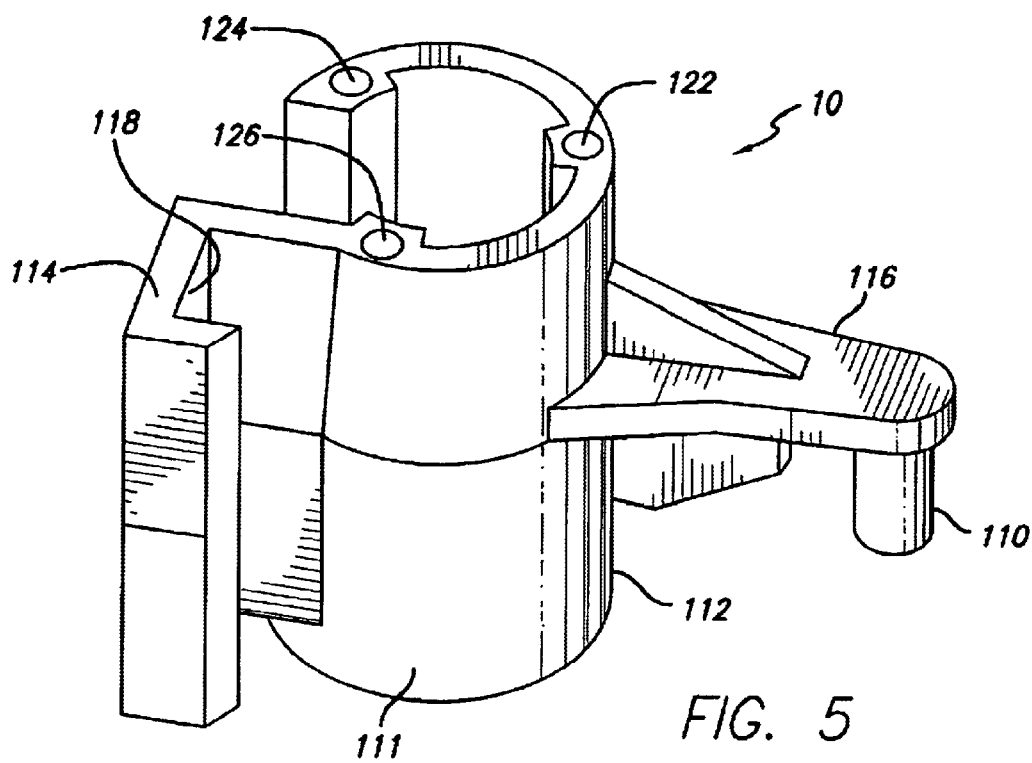
FIG. 5 is a perspective view of a hinge for use with the printer of FIG. 1 in accordance with the present invention.
Figure 6:
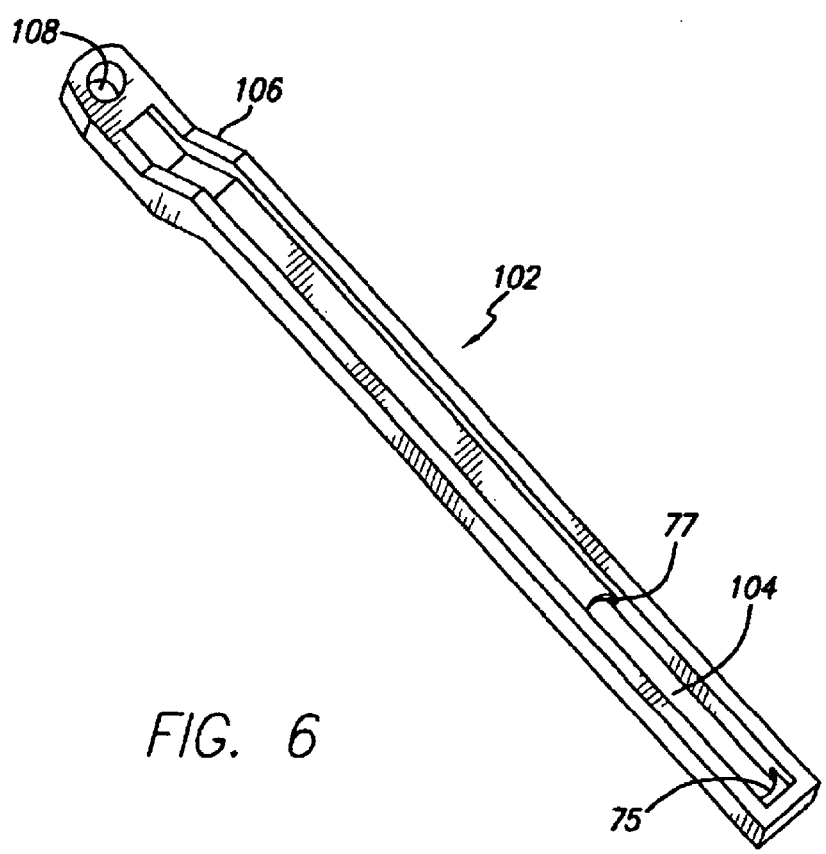
FIG. 6 is a perspective view of a linkage for use with the hinge of FIG. 5 in accordance with the present invention.

In accordance with another preferred embodiment of the present invention, a back portion 98 (FIG. 10) of ribbon carriage 30 is movably linked to printer hinge 10 by way of an elongated plastic linkage 102 (FIGS. 6, 10). Linkage 102 is preferably of I-beam-type construction for optimal structural strength and is provided at its ribbon carriage end with a generally rectangular slot 104 (FIGS. 6, 10) for movably accommodating a ribbon carriage post 100 which is an integral part of back portion 98 of ribbon carriage 30 (FIG. 10). Linkage 102 is hinged at the other end to printer hinge 10 by way of an aperture 108 (FIG. 6) adapted for receiving a lever arm 110 (FIG. 5) of hinge 10. Linkage 102 also has a jog 106 (FIG. 10) which, in the shown configuration, is needed to clear a bulge 118 (FIG. 10) provided on one of the exterior sides of upper platform 8 for accommodating print media roll holder 16 in accordance with the present invention. Thus, linkage 102 is captured between bulge 118 and a side boss 101 which is an integral part of upper frame 8 as shown in FIGS. 8–11. An identically shaped bulge 120 (FIGS. 7–8, 12) is provided on the other exterior side of upper frame 8 for accommodating print media roll holder 14, respectively. Other upper frame and linkage configurations may be utilized to practice the present invention provided such other configurations agree with the intended purpose of the present invention.

Linkage 102 has a stationary pivot at its printer hinge end and a dynamic pivot at its ribbon carriage end in accordance with the present invention. Dynamic pivoting is a result of ribbon carriage post 100 sliding linearly inside slot 104 of linkage 102 between a maximum "down" (FIG. 8) and a maximum "up" (FIG. 14) position, as shown by bi-directional arrow 200 in FIG. 8, as ribbon carriage 30 rotates about hinge axis 13 (FIG. 10) when lid 3 is being opened by the user for ribbon loading or printhead cleaning. Maximum "down" position for ribbon carriage post 100 is at a bottom end 77 of slot 104 of linkage 102 (FIGS. 6, 8) and corresponds to ribbon carriage 30 being in a fully folded in state, i.e. manually pushed all the way in lid 3 (lid 3 being in a fully open position) by the user for cleaning thermal printhead 58 (see also FIG. 7). Maximum "up" position for ribbon carriage post 100 is at a top end 75 (FIG. 6) of slot 104 of linkage 102 (FIGS. 9,14) and corresponds to lid 3 being in a fully closed position with floating printhead 58 aligned behind printhead alignment tabs 24, 26 (FIG. 1) in accordance with the present invention.

Figure 13:
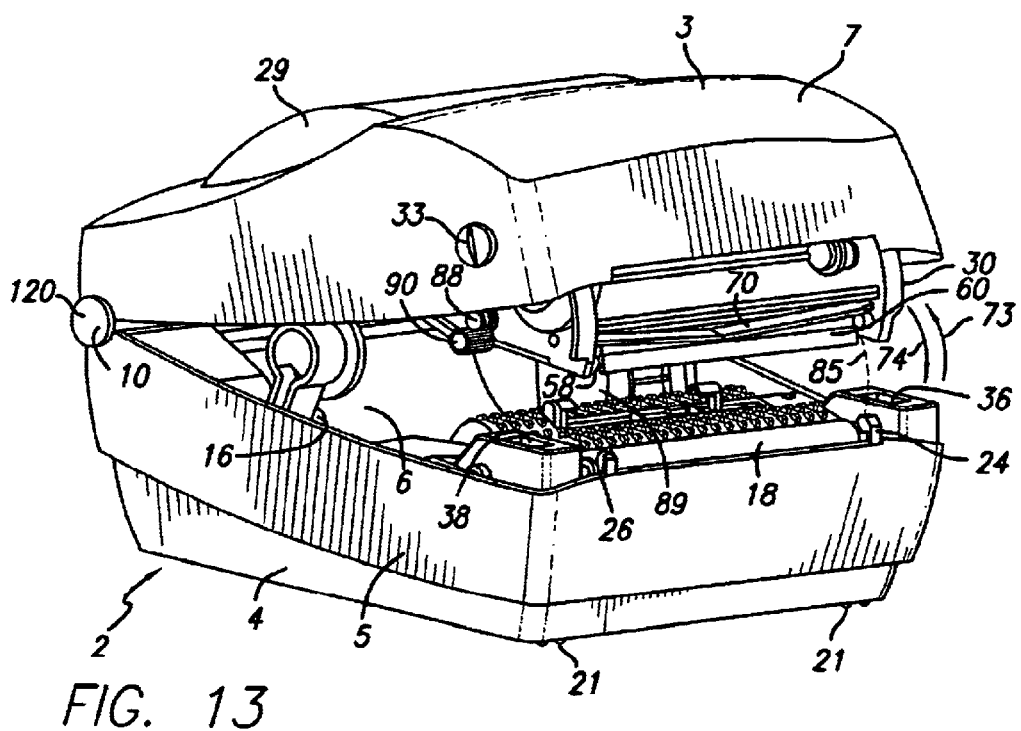
FIG. 13 is a perspective view of still another preferred embodiment of the present invention.

In accordance with the best mode for practicing the invention, as lid 3 is being opened from a fully closed position by the user, ribbon carriage 30 by virtue of its mass (i.e. under the force of gravity) rotates downwards (towards lower frame 6) about hinge axis 13 (FIG. 10) by itself. In other words, as lid 3 is being opened, ribbon carriage 30 automatically folds out of lid 3 with the motion of the front edge of printhead 58 describing a downward arc 71 (FIG. 13). When lid 3 reaches a fully open position (lid lock 31 automatically latches lid 3 in the fully open position), ribbon carriage 30 is in a fully folded out state (FIGS. 1–4, 11) automatically presenting itself for easy ribbon and media loading. This is a marked improvement over the prior art method of loading new ribbon and media which involves a great number of steps and expenditure of time not to mention being frequently a source of frustration for the average user. When ribbon carriage 30 is in a fully folded out state, the position of ribbon carriage post 100 inside slot 104 is slightly offset from top end 75 of slot 104 as shown, for example, in FIG. 11 in accordance with the general principles of the present invention.

Figure 9:
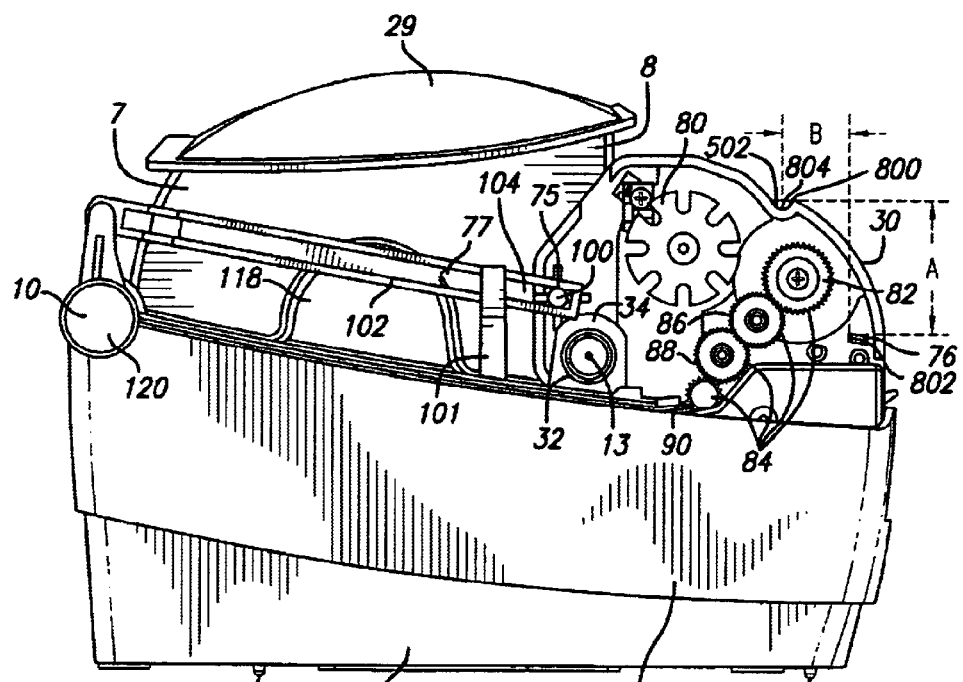
FIG. 9 is a side view of another preferred embodiment of the present invention.

If printhead 58 is in need of maintenance, the user manually folds ribbon carriage 30 fully inside lid 30 as shown in FIG. 7 for cleaning printhead 58. After cleaning printhead 58, the user may either manually fold ribbon carriage 30 out from inside lid 3 to its fully folded out state before proceeding with closing of lid 3 or leave ribbon carriage 30 in a fully folded in (inside lid 3) state and proceed with closing lid 3 whereby at some point during closing, ribbon carriage 30 by virtue of its mass (i.e. under the force of gravity) will automatically fold out of lid 3 completely after which ribbon carriage 30 will begin to rotate upwards (towards upper frame 8) about hinge axis 13 by itself. In other words, as lid 3 is being closed, ribbon carriage 30 automatically folds in lid 3 with the motion of the front edge of printhead 58 describing an upward arc 73 (FIG. 13). When lid 3 reaches a fully closed position, ribbon carriage 30 is in a fully folded in (inside lid 3) state (FIGS. 9, 14). When ribbon carriage 30 is in a fully folded in state, the position of ribbon carriage post 100 inside slot 104 is at top end 75 of slot 104 as shown, for example, in FIGS. 9, 14 in accordance with the general principles of the present invention.

In order to ensure proper positioning of floating thermal printhead 58 for printing during closing of lid 3, the angular motion of ribbon frame 30 about hinge axis 13 is timed to allow the two front edge portions of printhead 58 which are not covered by V-shaped printhead support bracket 60 (see, for example, front edge portion 57 of printhead 58 in FIG. 10) to gradually "sneak up" (align) behind alignment tabs 24, 26 as shown by arcs 85, 89 in FIG. 13. Alignment of a floating thermal printhead (such as printhead 58) behind alignment tabs (such as alignment tabs 24, 26) in a thermal transfer printer of this type is described in U.S. Pat. No. 6,068,415 to Smolenski, assigned to the assignee of the present application, the disclosure of which is incorporated herein by reference.

Furthermore, to properly bias (i.e. to apply the proper amount of pressure on) printhead 58 against platen 18 for printing, ribbon carriage 30 is provided with a pair of oppositely spaced recesses 500, 502 on the top portions of side walls 52, 51 of ribbon carriage 30, respectively, (FIG. 12) which are shaped for mating with latch shaft 17 (FIGS. 12, 15) when ribbon carriage is in a fully folded in state (inside lid 3), i.e. when lid 3 is fully closed for printer operation. Thus, latch shaft 17, which serves in this case as an end stop for the rotational movement of ribbon carriage 30 about hinge axis 13, presses against recesses 500, 502 of ribbon carriage 30 when lid 3 is fully closed (for printer operation) which translates into corresponding biasing of printhead 58 against platen 18 by way of leaf spring 70 and V-shaped printhead support bracket 60. Therefore, ribbon carriage 30 is sandwiched between latch shaft 17 and platen 18 when lid 3 is fully closed for printer operation. In this regard, a person skilled in the art would readily appreciate that distance C (FIG. 15), defined, for example, between center 700 on latch shaft axis 704 of latch shaft 17 and front edge 702 of foot 411 of latch 39 as well as distance A, defined, for example, between top edge 800 of recess 502 on side wall 51 and top edge 802 of leaf spring aperture 76 as projected in FIG. 9, and distance B, defined, for example, between bottom 804 of recess 502 on side wall 51 and top edge 802 of leaf spring aperture 76 as projected in FIG. 9 are critical distances in order to get the correct printhead spring deflection and the critical distances are tightly toleranced in order to keep the desired printhead alignment required for printing.

As shown in FIG. 5, printer hinge 10 comprises a plastic cylindrical hollow body 112 having a mounting leg 114 which has a groove 118 for mating with a corresponding hinge protrusion (not shown) provided on the underside of lower frame 6. After inserting the hinge protrusion in groove 118, mounting leg 114 is screwed to lower frame 6. Printer hinge 10 also has a substantially vertical stem 116 equipped with a lever arm 110 disposed at about 90 degrees to vertical stem 116 for insertion in aperture 108 of linkage 102 during printer assembly. Hinge 10 is also provided with a hinge cap 120 (FIGS. 1–4) which has three mounting legs (not shown) on its underside for mating with corresponding apertures 122, 124, 126 (FIG. 5).

Integral hinge 12 has a similarly shaped plastic body 122 and a plastic cap 124 (FIG. 14). To hinge upper frame 8 to lower frame 6, upper frame 8 is provided with a generally hollow cylindrical bottom end 128 (FIG. 14) which curves away from upper frame 8 and is adapted at each side for frictional insertion into hinge 10, 12, respectively (FIG. 14). For example, one side of cylindrical bottom end 128 of upper frame 8 is inserted at end 111 of hinge 10 (FIGS. 5, 14). Other hinging configurations may be used, provided such other hinging configurations agree with the intended purpose of the present invention.

Figure 2:
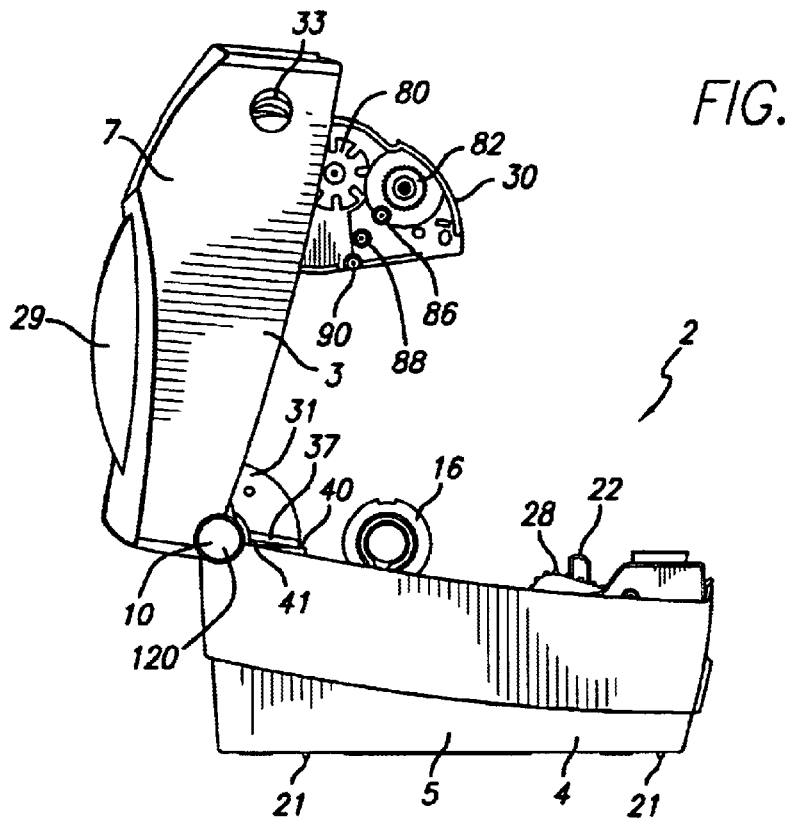
FIG. 2 is a side view of the printer of FIG. 1 in accordance with the present invention.

A person skilled in the art would appreciate that the angular range of motion for lid 3 about printer hinges 10, 12 and for linkage 102 about lever arm 110 would vary based on printer configuration. As an example, lid 3 may be designed to sweep through an angle of about 83 degrees about printer hinges 10, 12 from a fully closed to a fully open position. In such a case, linkage 102 may be designed to sweep through an angle of 80.9 degrees about lever arm 110 from a fully "down" to a fully "up" position. A fully "down" position for linkage 102 would correspond to ribbon carriage post 100 being in maximum "up" position at top end 75 of slot 104 of linkage 102, i.e. lid 3 is fully closed. A fully "up" position for linkage 102 would correspond to ribbon carriage post 100 being in maximum "down" position at bottom end 77 of slot 104 of linkage 102, i.e. lid 3 is fully open (latched) and ribbon carriage 30 is folded all the way in (inside lid 3) for printhead maintenance. For the same example, the bottom of ribbon carriage 30 may be allowed to sweep through an angle of about 80 degrees about hinge axis 13 from a fully folded in to a fully folded out position (FIGS. 1, 2 and 7).

Furthermore, although printer 2 has been described so far for use as a thermal transfer printer (with ribbon), printer 2 may easily be adapted by the user for direct thermal printing by simply removing the ribbon and its associated ribbon supply and ribbon take up rolls and providing suitable print media. No other modifications to printer 2 are needed. Thus, the above-disclosed setup may also be described as a universal (thermal transfer/direct thermal) printer.

The above-described novel printer uses fewer parts than conventional printers and is designed for easy ribbon loading and equally easy media (e.g., paper) loading which is a major improvement over prior art printers. The inventive printer also provides a low cost, light-weight, and easy printhead access (for printhead maintenance) solution for the average user. Furthermore, the above-described novel lid-hinged ribbon carriage setup makes possible for the first time the loading of ribbon media without having to thread through/around the ribbon mechanism.

The invention comprises a clutch disk made of plastic, which may be used in a printer mechanism. The design utilizes two different injection molded plastic clutch disks that run face to face to produce relatively high dynamic frictional forces. The two plastics used are LNP Engineering Plastics DFL-4036 and RCL-4036. The disks are produced by injection molding of the plastics.

Figures 21A, 21B, 21C:
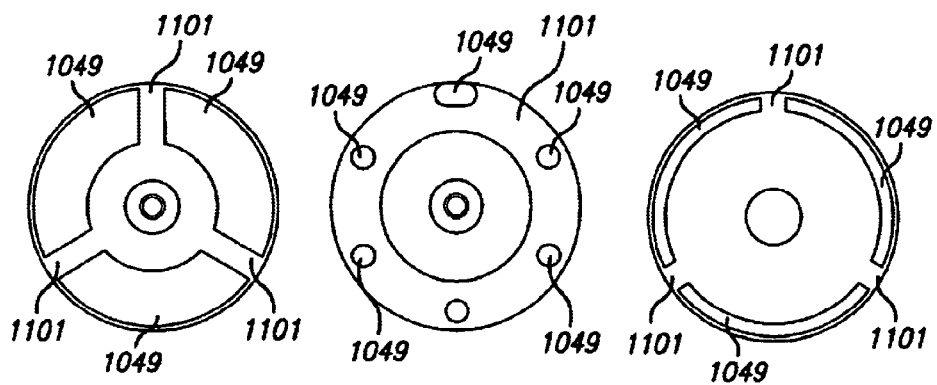
FIG. 21a shows the face of the injection molded plastic clutch disk with raised areas.
FIG. 21b shows the face of the injection molded plastic clutch disk with a different set of raised areas and is an example of a different pattern for the raised areas.
FIG. 21c shows another version of the face of the injection molded plastic clutch disk with raised areas.

In a preferred embodiment of this invention, the clutch assembly uses raised areas on one of either of the facing sides of a pair of clutch disks. The raised areas allow a better overall contact between the disks so as to achieve an effective high dynamic and low static coefficient of friction, relative to prior results in plastic injection molded clutch disks. In the past, it has been found that injection molding of a plastic did not result in a smooth, even surface. Therefore, trying to produce injection molded clutch disk pairs did not result in a viable clutch assembly, since the actual point or points of contact between the two disks was minimal. Examples of various arrangements of the raised areas have (non-raised) spaces 1101 (FIGS. 21a, 21b, 21c) between the sectors of raised areas 1049. These spaces allow for debris to be swept into these non-contacting areas so as to reduce wear from particles tending to be trapped between the contacting surfaces of the clutch disks. The materials chosen for the clutch disks (DFL-4036, RCL-4036) have desirable coefficients of friction (static: 0.18 (DFL), 0.11 (RCL); dynamic: 0.20 (DFL), 0.15 (RFL)) and also have desirable wear factors, viz., 30 (DFL) and 10 (RCL)and so wear well against each other.

Figure 17:
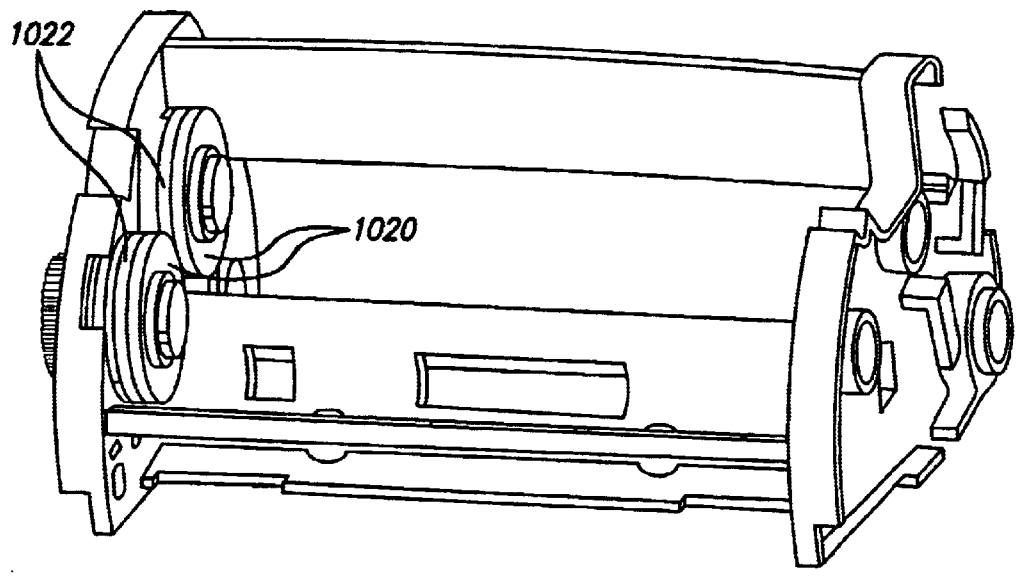
FIG. 17 shows the printer ribbon clutch design, with out the printer ribbon in place.

A clutch assembly as in this embodiment may be used to regulate and maintain proper tensioning in a printing ribbon, for a printer. The plastic clutch assembly is shown in FIG. 17 with the pairs of plastic clutch disks. The first disks 1020 are made from LNP ENGINEERING PLASTICS® DFL-4036® and the second disks 1022 are made from LNP ENGINEERING PLASTICS® RCL-4036®. The DFL Series plastics are a glass fiber reinforced, PTFE (polytetrafluoroethylene) lubricated polycarbonate. The RCL Series plastics are a PTFE lubricated, carbon fiber reinforced nylon.

Table I shows the properties of DFL-4036® and Table II shows the properties of RCL-4036.

TABLE I

DFL-4036

| PROPERTY | ASTM METHOD | UNITS | LUBRICOMP* DFL-4036 30% glass fiber 15% PTFE |
|---|---|---|---|
| PHYSICAL | | | |
| SPECIFIC GRAVITY | D 792 | N/A | 1.550 |
| SHRINKAGE-FLOW DIRECTION | D 955 | % @ 0.125" | .10 to .30 |
| TG (GLASS TRANSITION) | D 3418 | F. | 300.0 |
| WATER ABSORPTION | D 570 | % | .06 |
| MECHANICAL | | | |
| TENSILE STRENGTH | D638 | PSI | 17,500 |
| TENSILE ELONGATION | D638 | % | 4.0 to 6.0 |
| FLEXURAL STRENGTH | D 790 | PSI | 24,000 |
| FLEXURAL MODULUS | D 790 | PSI | 1,200,000 |
| IZOD IMPACT CUT NOTCH (1/8") | D 256 | FT-LB/IN | 3.00 |
| IZOD IMPACT (UNNOTCHED) | D 256 | FT-LB/IN | 12.0 to 14.0 |
| THERMAL | | | |
| H.D.T.U.L. (DEG F.; @264 PSI) | D 648 | F. | 290 |
| FLAMMABILITY RATING | U.L. SUBJECT 94 | RATING- | V-1 @ 0.125" (ALL CO |
| TRIBOLOGICAL | | | |
| WEAR FACTOR (K) | LNP #3 | 10E-10 | 30 |
| COEFF. OR FRICTION DYNM. | LNP #3 | 40 PSI, 50 FPM | .20 |
| COEFF. OF FRICTION STATIC | LNP #3 | 40 PSI | .18 |
| ELECTRICAL | | | |
| SURF RESIS (10E) DR. T ON CHIP | D 257 | 10E OHMS/SQ | 16.0 |
| VOLUME RESIS. (10E) | D 257 | 10E OHM-CM | 16.0 |

*LUBRICOM is a registered trademark of LNP Engineering Plastics Inc.

TABLE II

RCL-4036

| PROPERTY | ASTM METHOD | UNITS | LUBRICOMP* RCL-4036 BK8-15% PTFE 30% carbon fiber |
|---|---|---|---|
| PHYSICAL | | | |
| SPECIFIC GRAVITY | D 792 | N/A | 1.380 |
| SHRINKAGE-FLOW DIRECTION | D 955 | % @0.125" | .20 to .30 |
| MELT POINT (RESIN) | D 3418 | F. | 500.0 |
| WATER ABSORPTION | D 570 | % | .48 |
| MECHANICAL | | | |
| TENSILE STRENGTH | D638 | PSI | 27,400 |
| FLEXURAL STRENGTH | D 790 | PSI | 38,500 |
| FLEXURAL MODULUS | D 790 | PSI | 2,100,000 |
| IZOD IMPACT CUT NOTCH (1/8") | D 256 | FT-LB/IN | 1.10 |
| IZOD IMPACT (UNNOTCHED) | D 256 | FT-LB/IN | 8.0 |
| THERMAL | | | |
| H.D.T.U.L. (DEG F.; @ 264 PSI) | D 648 | F. | 490 |

TABLE II-continued

RCL-4036

| PROPERTY | ASTM METHOD | UNITS | LUBRICOMP* RCL-4036 BK8-15% PTFE 30% carbon fiber |
|---|---|---|---|
| TRIBOLOGICAL | | | |
| WEAR FACTOR (K) | LNP #3 | 10E-10 | 10 |
| COEFF. OR FRICTION DYNM. | LNP #3 | 40 PSI, 50 FPM | .15 |
| COEFF. OF FRICTION STATIC | LNP #3 | 40 PSI | .11 |

*LUBRICOM is a registered trademark of LNP Engineering Plastics Inc.

Figure 18:
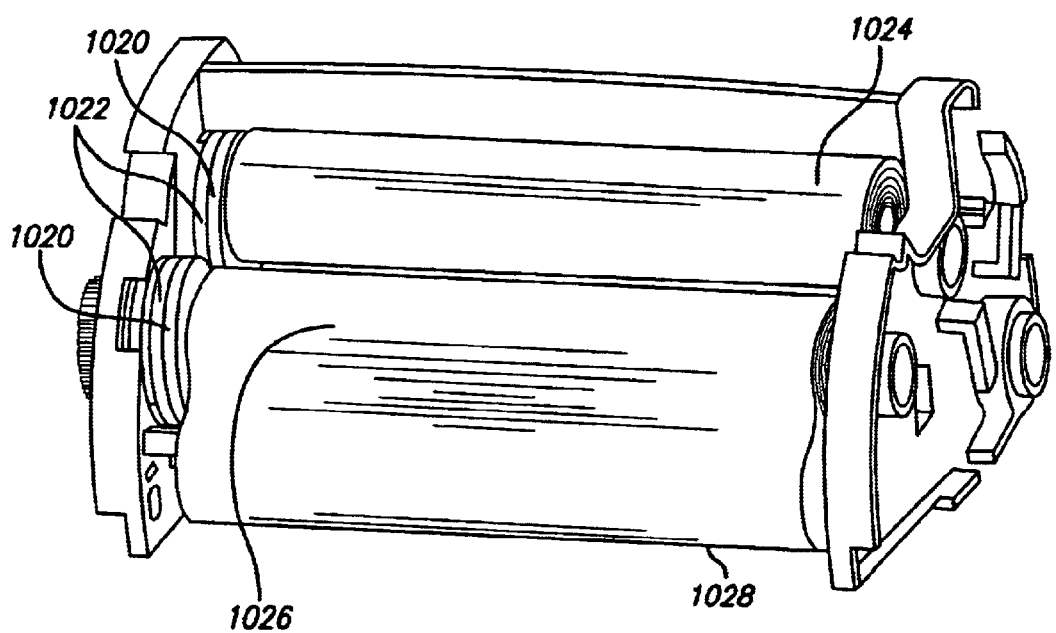
FIG. 18 shows the ribbon clutch design with a printer ribbon in place.

FIG. 18 shows the supply roll 1024 and the take-up roll 1026 with the printing ribbon 1028 being unwound from the supply roll 1024 and being taken up on the take-up roll 1026. The printing ribbon 1028 is initially wound on the supply roll 1024 and gradually is wound on the take-up roll 1026, as the printing operation proceeds. During the printing operation, while printing labels, for example, the printing ribbon 1026 may be rewound onto the supply roll 1024. The label is presented outside of the printer to be taken by the user. Rewinding is to get the top of the next label under the print line.

An important part of the printing operation, or procedure, is to maintain tension in the ribbon 1028 to prevent wrinkling and to present a portion of the ribbon 1028, when about to be printed, in a flat, somewhat tensioned state. The tensioning needs to be maintained when the ribbon 1028 is partially rewound so as to avoid slackening which causes poor ribbon 1028 peel off, wrinkling and subsequent poor print quality.

Figure 19:
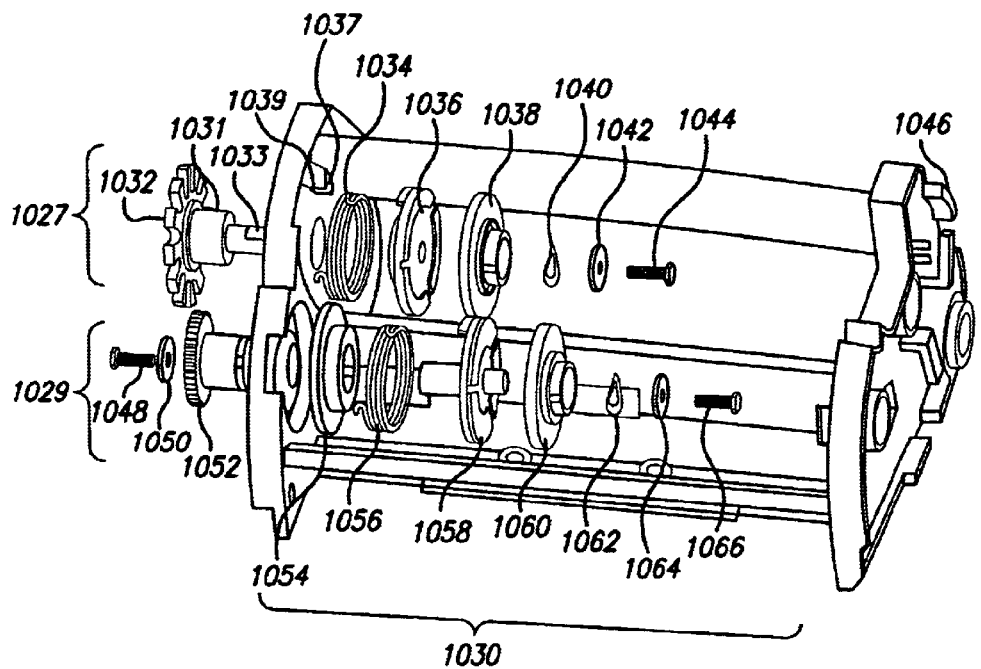
FIG. 19 shows an exploded view of the ribbon clutch assembly.

FIG. 19 shows an exploded view of the clutch assembly. The clutch assemblies 1030 are held in a frame 1046 that may be made of plastic. The clutch assemblies 1030 comprise a rear clutch subassembly 1027 associated with the printer ribbon supply roll 1024 (FIG. 18) and a front clutch subassembly 1029 (FIG. 19) associated with the take-up roll 1026 (FIG. 18). The front clutch subassembly 1029 is discussed below.

The rear clutch assembly (FIGS. 19, 20a, 20b), which acts directly on the supply roll, comprises a supply spindle 1032 which has a cylindrical shaft 1031 ending in a flattened key-like part of the shaft 1033. A first torsion spring 1034 is disposed between the inside wall 1045 (FIGS. 20a, 20b) near the spindle hole 1097 and a first inner-torsion clutch disk 1036. This first inner torsion spring 1034 has a first spring leg 1037 which is stopped by a first stop 1039 which is molded as part of the inside wall 1045. A second stop 1041 (FIG. 20a) for the second leg 1043 of the first torsion spring is molded as part of the first inner torsion clutch disk 1036. Note that the first torsion spring 1034 (in FIG. 20b) is a torsion only spring, and is shown slightly expanded only for clarity.

Figure 20A:
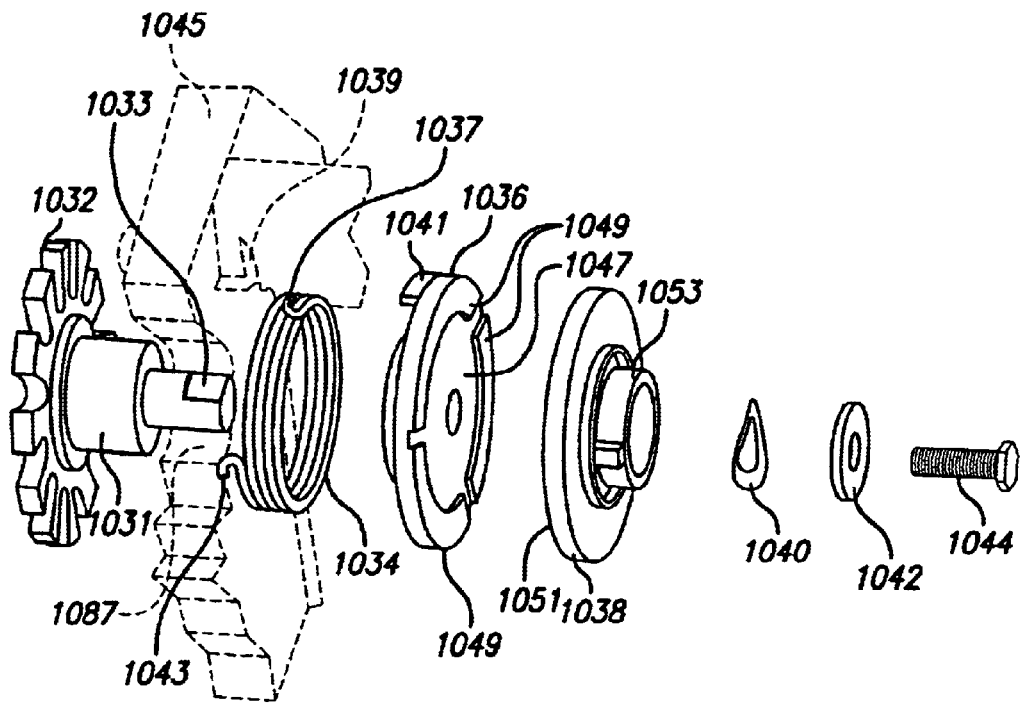
FIG. 20a shows the details of the rear clutch assembly.
Figure 20B:
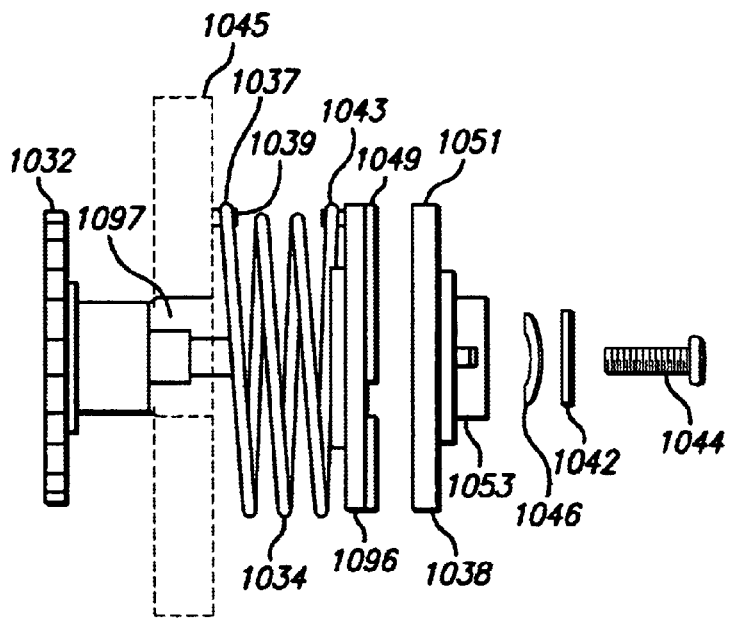
FIG. 20b shows the details of a slightly expanded side view of the rear clutch assembly.

The first inner-torsion clutch disk 1036 has raised clutching areas 1049 on its clutching face 1047 as is shown in FIGS. 20a and 20b. The first outer clutch disk 1038 has a clutching face 1051, which does not have the raised areas. The center of the first outer clutch disk 1038 has a hole 1053, which mateably couples with the key-like end 1033 of the supply spindle shaft 1031. The key-like end 1033 of the supply spindle shaft 1031 is threaded to receive a hold down screw 1044. This screw is tightened to hold down flat washer 1042, which in turn compresses a spring washer 1040. The spring washer is mounted with the concave surface toward the head of the hold down screw.

For the first clutch assembly (FIG. 19), a rotational movement of the supply hub causes the first outer clutch disk 1038 with its clutching face 1051 and the supply spindle 1032 and supply spindle shaft 1031, 1033 to turn with the same rotational motion (i.e., same angular velocity). The supply hub is integrally molded as part of the first outer clutch disk 1038. As this rotational movement of the supply hub proceeds, the printer ribbon 1028 is pulled and unwound from the supply roll 1024. The first inner-clutch disk 1036, with the raised clutching area 1049 on its clutching face 1047, is pressed by the first outer clutch disk 1038. This clutch disk 1038 is subject to a force arising from the compression of the spring washer 1040, as it is compressed by flat washer 1042 and the hold down screw 1044. The pressing force on the first outer clutch disk 1038 results in a forced contact of the clutching surface 1049 of the first clutch inner disk 1036 and the clutching surface 1051 of the first outer clutch disk 1038. The coefficient of static friction between the disks allows the two clutch disks 1036, 1038 to start rotating together. However, the torsion spring 1034 continues to be engaged at its second leg 1043 by the second stop 1041 of the first inner-torsion clutch disk 1036. The torsion spring 1034 continues to be engaged at it first leg 1037 by the first stop 1039 which is molded as part of the inside wall 1045 and the torsion spring 1034 begins to wind up. The torsion springs are pre-tensioned and the legs of the springs are always engaged for both supply and take-up assemblies. As the torsion spring 1034 winds up, some potential energy is stored in the torsion spring 1034. This spring potential also is translated into tension on the printer ribbon 1028. This is seen by tracing the path backward, where the wound spring exerts force through its first leg 1037 (FIG. 20a) on the first stop 1039 (which is molded as part of the inside wall 1045), and through its second leg 1043 on the second stop 1041. In turn, the second stop 1041 exerts force on the inner clutch disk 1036 which exerts through static frictional force exerts a torque on the outer clutch disk 1038. The supply ribbon roll 1026 (FIG. 18), in its turn, has tensioning torque exerted on it, since it is effectively connected to the outer clutch disk as a rigid body.

After the torsion spring 1034 is wound up, typically between one-quarter and three-quarters of a turn, the clutching surfaces (1049, 1051) begin to slip relative to each other, since the effective drag force arising from the static coefficient of friction has been overcome. As the first outer clutch disk 1038 continues to rotate, the first inner clutch disk 1036, is rotated along by forces arising from the dynamic coefficient of friction between the two clutch disks 1036, 1038. The torsion spring 1034 may be viewed as acting to buffer the torque acting on the supply roll of printer ribbon 1024.

In the frame of reference of the printer ribbon 1028, tension is applied to the printer ribbon 1028, by a torque supplied to the supply roll 1024. This torque is equal to the force applied to the printer ribbon 1028 multiplied by the distance of the ribbon from the center of the supply roller 1024. This torque is transmitted to the first outer clutch disk 1038, by the force equivalent to a rigid body force between the roller 1024 and the first outer clutch disk (i.e., supply hub with clutching surface) 1038. At first, the amount of torque exerted by the outer clutch disk 1038 on the first inner clutch disk 1036 in within the limit of the static coefficient of friction between the first and the second disks (1036, 1038). There is no relative motion of the disk (i.e., the clutch system is in the static friction regime).

When the amount of torque exerted by the outer clutch disk 1038 on the first inner clutch disk 1036 exceeds the limit of the static coefficient of friction between the first and the second disks (1036, 1038), the torque exerted by the spring potential of the torsion spring 1034 on the first inner clutch disk 1036 tends to rotate the first inner clutch disk 1036 in a direction opposite to the relative rotary motion of the first outer clutch disk 1038. As the first outer clutch disk 1038 rotates relative to the first inner clutch disk 1036, the frictional drag force arises from the dynamic coefficient of friction (i.e., the clutch system is in the dynamic friction regime).

According to the choice of materials (se Table I, Table II), the dynamic coefficient of friction is relatively high compared to other choices of plastics. The static coefficient of friction is still higher for the clutch disk pairs (1036, 1038; 1056, 1060) than the dynamic coefficient of friction. Then the rotation of the first outer clutch disk 1038 tends to result in the rotation of the first clutch disk 1036, until the forces arising from the dynamic coefficient of friction are exceeded. The torsion spring will tend to be wound up and exerting back toque on the first inner clutch disk 1036. The first outer clutch disk 1038 will rotate subject to the dynamic drag of the first inner clutch disk 1036. The maximum tensioning of the printer ribbon 1028 at the supply roll 1024 occurs when the clutch disks (1036, 1038) are operating in the static friction regime. This tensioning torque, in the dynamic frictional regime, only drops to about two-thirds of that tensioning in the static frictional regime.

The parameters which must be selected include torsion spring constant, spring washer spring constant, and for the two sets of clutch disks, the coefficients of mutual static friction and mutual dynamic friction. Typical numbers include running the printer ribbon at about four inches per second; exerting 275 to 375 g(force)-cm of torque on a rotating element in a dynamic frictional regime, and exerting about 425 g(force)-cm of torque in a static frictional regime. As will be seen below, the take up clutch assembly is driven at a slightly higher speed so as to maintain a positive stretching tension in the printer ribbon. The materials chosen for the clutch disks not only have the desirable coefficients of friction, but also have good wear characteristics against each other.

The front clutch assembly, while operating on the same physical principles as the rear clutch assembly, has a little different mechanical arrangement. The front clutch assembly 1029 (FIG. 19) receives motive power through the take-up spindle gear 1052 (FIGS. 19, 20c, 20d) which may be driven by other gears (not shown) connected to a driving motor (not shown). An inner torsion disk 1054 that has a stop 1081 integrally molded into the inner torsion disk 1054, which engages one leg 1083 of the second torsion spring 1056. The inner torsion disk 1054 is molded with a centered keying aperture 1080 (see FIGS. 20c and 20d) which engages a mateably formed end 1087 of the take-up spindle gear. Therefore, as the take-up spindle gear 1052 rotates, the inner torsion disk 1054 rotates, and the stop 1081 on the inner torsion disk 1054 rotates and engages a first leg 1083 of the second torsion spring 1056. Note that the second torsion spring 1056 (in FIG. 20d) is a torsion only spring, and is shown slightly expanded only for clarity.

A buff or axle 1073 extends from the second inner clutch (take-up friction) disk 1058 through a second torsion spring 1056, through an inner torsion disk, 1054 and into a take-up spindle gear 1052. The take-up spindle gear 1052 is fastened to the axle 1073 by a screw 1048. The flat washer 1050 and the screw 1048 provide a pivotal mount for the axle 1073, which is free to rotate. The screw 1048 does not clamp the washer 1050 tightly. A clearance of about 0.005 inches is provided between the head of the screw 1048 and washer 1050, when the washer 1050 is in tensioned contact with the take-up spindle gear 1052 and the screw 1048 is in its final screwed-in holding position.

The other leg 1093 of the second torsion spring 1056 engages a stop 1095 on the non-clutching surface of the second inner clutch disk (take-up friction disk) 1058. The second inner clutch disk 1058 has a second buff or axle 1065 extending toward the second outer clutch disk 1060. The second outer clutch disk (which has the integrally molded take-up hub 1061) is attached to the axle 1065 by a spring washer 1062, a flat washer 1064 and a screw 1066.

Figure 20C:
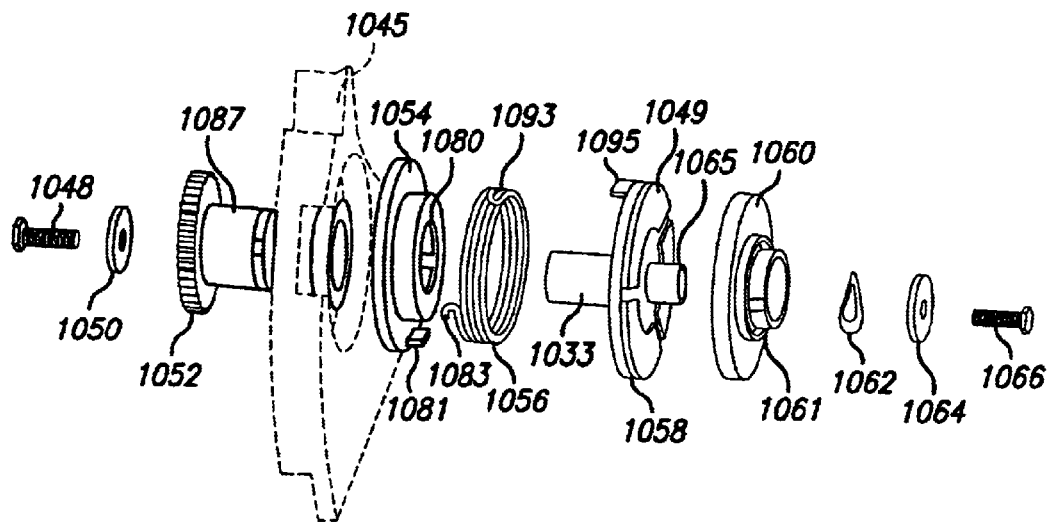
FIG. 20c shows the details of the front clutch assembly.
Figure 20D:
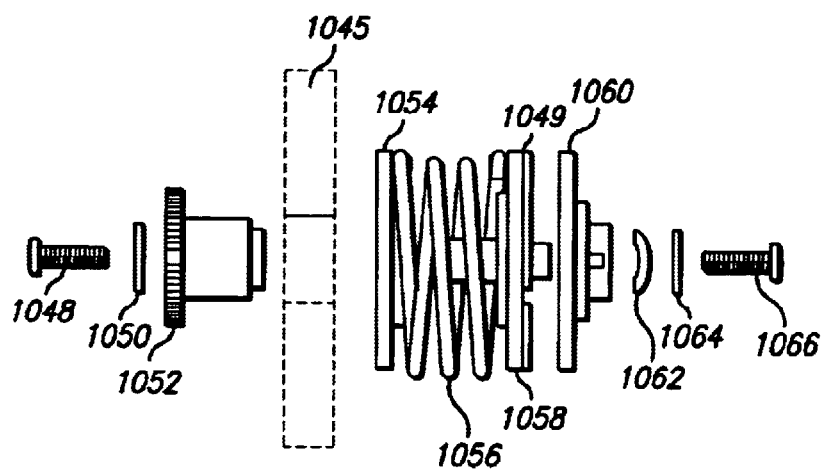
FIG. 20d shows the details of a slightly expanded side view of the front clutch assembly.

The front clutch assembly 1029, which acts on the supply roll 1026 by the second outer clutch disk 1060, utilizes a take-up hub 1061 which is integrally injection molded with the second outer clutch disk 1060. The second inner-clutch disk 1058 serves as a take-up friction disk 1058. As shown in FIG. 20c, the clutching face (1047, 1049) of the second inner clutch disk 1058 and the clutching face 1051 of the second outer clutch disk 1060 face each other. The second inner clutch (take-up friction) disk 1058 has raised areas 1049 on its clutching face 1047 so as to better engage the clutching face 1051 of the second outer clutch disk 1060, which does not have raised areas.

As the spindle gear 1052 is driven by a gear (not shown) connected directly or indirectly to a driving motor (not shown), the inner torsion disk 1054 rotates. The stop 1081 on the inner torsion rotates and continues to engage a first leg 1083 of the second torsion spring 1056. The torsion springs are pre-tensioned and the legs of the springs are always engaged for both supply and take-up assemblies. The second torsion spring 1056 tends to be wound up, exerting a force on the stop 1095 on the second inner clutch disk 1058 through the torsion spring second leg 1093. As the force on stop 1095 increases, the second inner clutch disk 1058 tends to rotate. The static frictional forces between the second inner clutch disk 1058 and the second outer clutch disk 1060 act to rotate the second outer clutch disk 1060 and the take-up hub 1061 in step with the second inner clutch disk 1058. The take-up hub 1061 rotates the take-up roll of printer ribbon 1024.

When the static frictional forces are exceeded, as the second inner clutch disk 1058 tends to rotate the second outer clutch disk 1060, under the motive force of the take-up spindle gear 1052. This motive force is passed through by the inner torsion disk 1054 and the second torsion spring 1056. The second inner clutch disk 1058 acts to rotate the second outer clutch disk 1060 due to the frictional forces arising from the dynamic coefficient of friction between the two clutch disks 1058, 1060. Slippage between the two occurs, as the torque supported by the static coefficient regime changes to the torque supported by the dynamic coefficient regime. As an example, the torque might drop from about 375 g(force)-cm to about 275 to 210 g(force)-cm.

After a label has been printed and advanced to a position to be torn off, for example, it may be desirable to back the ribbon up so as to get to the top of the form. In this embodiment, the ribbon and media are married together at all times. Since the first torsion spring 1034 has been placed under tension and wound up to an extent, it has potential energy stored in it. In the stopping and backing up process, as the take-up spindle gear 1052 is stopped, the second torsion spring 1056 is held at its leg 1081 in a stopped position. The force of the torsion spring's other leg 1093 is transmitted to the stop 1095 of the take-up friction disk 1058. Thus, the force arising from the spring tensioning is transmitted from the second inner clutch disk 1058 to the second outer clutch disk 1060. The take-up hub 1061 tends to rotate backward as the take-up spindle gear 1052 reverses, tending to unwind the second torsion spring 1056. The printer ribbon 28 experiences the unrelaxed back-tensioning of the first torsion spring 1034, acting, as has been described, through the second inner clutch disk 1036, to the supply hub with clutching surface (i.e., first outer clutch disk) 1038. The supply roll 1024 is in essentially rigid body contact with the first outer clutch disk 1038. Consequently, the rotation of the first outer clutch disks tensions the supply roll 1024 and the printer ribbon 1028. As the first torsion spring 1034 tends to unwind, it tends to rewind the printer ribbon 1028 onto the supply roll 1024. Both springs unwind during back-up, where the second torsion spring will unwind 3% more than the first torsion spring, when the supply roll 1024 and the take-up roll 1026 have equal diameters.

The net result is a controlled rewinding of the printer ribbon, while retaining the printer ribbon under suitable tension to prevent wrinkling of the printer ribbon, to provide a sufficiently taut surface for the printing operation.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

It is claimed that:

1. A clutch comprising:
   a first plastic disk made from a first plastic;
   a second plastic disk made from a second plastic different from the first plastic;
   said first and second plastic disks adapted to press against each other over respective engagement surfaces;
   said first and second plastic disks having a relatively low static coefficient of friction relative to each other;
   said first and second plastic disks having a relatively high dynamic coefficient of friction relative to each other; and
   said first disk being adapted to rotate said second disk due to the coefficient of friction.

2. The clutch of claim 1 further comprising:
   said first plastic being LNP ENGINEERING PLASTICS® DFL-4036®;
   said second plastic being LNP ENGINEERING PLASTICS® RCL-4036®.

3. The clutch of claim 1 wherein at least one of said clutch disks has a plurality of raised areas to thereby define a respective said engagement surface.

4. The clutch of claim 1 wherein the relatively high dynamic coefficient of friction is at least two thirds the value of the relatively low static coefficient of friction.

5. The clutch of claim 1 wherein the first plastic is a glass fiber reinforced composite and the second plastic is a carbon fiber reinforced composite.

6. The clutch of claim 1 wherein the first plastic is a polycarbonate composite and the second plastic is a nylon composite.

7. The clutch of claim 1 wherein the first plastic is a glass fiber reinforced polycarbonate composite and the second plastic is a carbon fiber reinforced nylon composite.

8. A printer ribbon transport mechanism comprising:
   a reversible drive mechanism,
   a take up torsion spring,
   a take up clutch consisting of a first take up clutch plastic disk and a second take up clutch plastic disk;
   a take up spool coupled to the reversible drive mechanism by means of the take up clutch and the take up torsion spring to thereby maintain tension on a ribbon attached to the take up spool as the ribbon and the take up spool are being intermittently advanced by the drive mechanism,
   a mechanism frame;
   a supply torsion spring,
   a supply clutch consisting of a first supply clutch plastic disk and a second supply clutch plastic disk;
   a supply spool coupled to the frame by means of the supply clutch and the supply torsion spring to thereby maintain tension on the ribbon even when the ribbon is being unwound from the up spool by the drive mechanism being operated in a reverse direction,
   each said first plastic disk comprising a first plastic and each said second plastic disk comprising a second plastic different from said first plastic;
   said first and second plastic disks of each said clutch defining respective engagement surfaces adapted to press against each other;
   said first and second plastic disks of each said clutch having a relatively low static coefficient of friction relative to each other; and a relatively high dynamic coefficient of friction relative to each other; and
   said each first disk rotating each said second disk by interaction forces due to coefficient of friction between their respective engagement surfaces as the first disk is pressed against the second disc.

9. The printer ribbon transport mechanism of claim 8 wherin:
   said first plastic is LNP ENGINEERING PLASTICS® DFL-4036®;
   said second plastic is LNP ENGINEERING PLASTICS® RCL-4036®.

10. The printer ribbon transport mechanism of claim 8 wherein said first clutch disk is has plurality of raised areas which are adapted to insure a at least three smooth engagement areas with said second clutch disk.

11. The printer ribbon transport mechanism of claim 8 wherein the relatively high dynamic coefficient of friction is at least two thirds the value of the relatively low static coefficient of friction.

12. The printer ribbon transport mechanism of claim 8 wherein the first plastic is a glass fiber reinforced composite and the second plastic is a carbon fiber reinforced composite.

13. The printer ribbon transport mechanism of claim 8 wherein the first plastic is a polycarbonate composite and the second plastic is a nylon composite.

14. The printer ribbon transport mechanism of claim 8 wherein the first plastic is a glass fiber reinforced polycarbonate composite and the second plastic is a carbon fiber reinforced nylon composite.

* * * * *